(12) United States Patent
Asai

(10) Patent No.: US 8,384,959 B2
(45) Date of Patent: Feb. 26, 2013

(54) THRESHOLD MATRIX GENERATING METHOD, IMAGE DATA GENERATING METHOD, IMAGE DATA GENERATING APPARATUS, IMAGE RECORDING APPARATUS AND RECORDING MEDIUM

(75) Inventor: Hiroshi Asai, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 13/572,261

(22) Filed: Aug. 10, 2012

(65) Prior Publication Data

US 2012/0307313 A1 Dec. 6, 2012

Related U.S. Application Data

(62) Division of application No. 12/115,879, filed on May 6, 2008, now Pat. No. 8,279,490.

(30) Foreign Application Priority Data

May 24, 2007 (JP) ................. P2007-137565

(51) Int. Cl.
*G06K 15/00* (2006.01)
*H04N 1/405* (2006.01)

(52) U.S. Cl. ........... 358/3.13; 358/3.01; 358/3.03; 358/3.06; 358/1.8; 382/237; 382/270; 345/596

(58) Field of Classification Search .......... 358/3.01, 358/3.03, 3.06, 3.13, 1.8; 382/237, 270; 345/596–599
See application file for complete search history.

(56) References Cited

U.S. PATENT DOCUMENTS

| 5,526,438 A | 6/1996 | Barton |
| 5,726,772 A | 3/1998 | Parker et al. |
| 5,761,325 A | 6/1998 | Barton |
| 2001/0017702 A1* | 8/2001 | Kito ................. 358/1.2 |
| 2001/0033313 A1* | 10/2001 | Ohno et al. .......... 347/68 |
| 2002/0071140 A1* | 6/2002 | Suzuki et al. ........ 358/455 |

(Continued)

FOREIGN PATENT DOCUMENTS

| EP | 1 241 865 | 9/2002 |
| EP | 1 267 564 | 12/2002 |

(Continued)

OTHER PUBLICATIONS

Japanese Office Action issued Apr. 1, 2011 in connection with corresponding Japanese Patent Application No. 2007-137565.

(Continued)

*Primary Examiner* — King Poon
*Assistant Examiner* — Allen H Nguyen
(74) *Attorney, Agent, or Firm* — Ostrolenk Faber LLP

(57) ABSTRACT

In a matrix area, a plurality of linear areas each of which extends in a tilt direction tilted relatively to row and column directions are arranged in a direction perpendicular to the tilt direction without spaces, and the plurality of linear areas are alternatively assigned to first and second element groups along an arrangement direction. One element is specified in each element group, and subsequently a process of specifying an element farthest from the specified elements is repeated, to acquire a turn-on order of dots with increase in gray level in one grayscale range and a turn-off order of dots with decrease in gray level in the remaining grayscale range, and a threshold value of each element is determined according to these orders. Thus, generated is a threshold matrix capable of reducing graininess in a halftone image with directionality in the tilt direction, and improving the reproduction of thin lines and characters.

20 Claims, 14 Drawing Sheets

U.S. PATENT DOCUMENTS

| | | |
|---|---|---|
| 2004/0217972 A1 | 11/2004 | Deishi |
| 2004/0218221 A1 | 11/2004 | Hirano et al. |
| 2005/0264834 A1 | 12/2005 | Asai et al. |
| 2006/0077469 A1* | 4/2006 | Asai et al. .................... 358/3.06 |
| 2006/0152767 A1 | 7/2006 | Asai et al. |
| 2006/0279789 A1 | 12/2006 | Yamazaki et al. |

FOREIGN PATENT DOCUMENTS

| | | |
|---|---|---|
| EP | 1 601 182 | 11/2005 |
| JP | 92/10905 | 6/1992 |
| JP | 2622429 | 4/1997 |
| JP | 2004-166163 | 6/2004 |
| JP | 2004-336163 | 11/2004 |
| JP | 2005-341330 | 12/2005 |
| JP | 2006-14271 | 1/2006 |
| JP | 2006-191487 | 7/2006 |
| JP | 2007-53714 | 3/2007 |
| WO | WO 00/59209 | 10/2000 |

OTHER PUBLICATIONS

European Search Report issued Sep. 11, 2008.

Wild, J.W., "Systematics of Generalized Halftoning Cells for Ordered Dither Digital Haftoning and Application in Ink-Jet Printers," Proceedings of the International Congress on Advances in Non-Impact Printing Technologies, pp. 214-224 (1989).

* cited by examiner

LOW (HIGHLIGHT)          HIGH (SHADOW)
GRAY LEVEL

F/G. 14
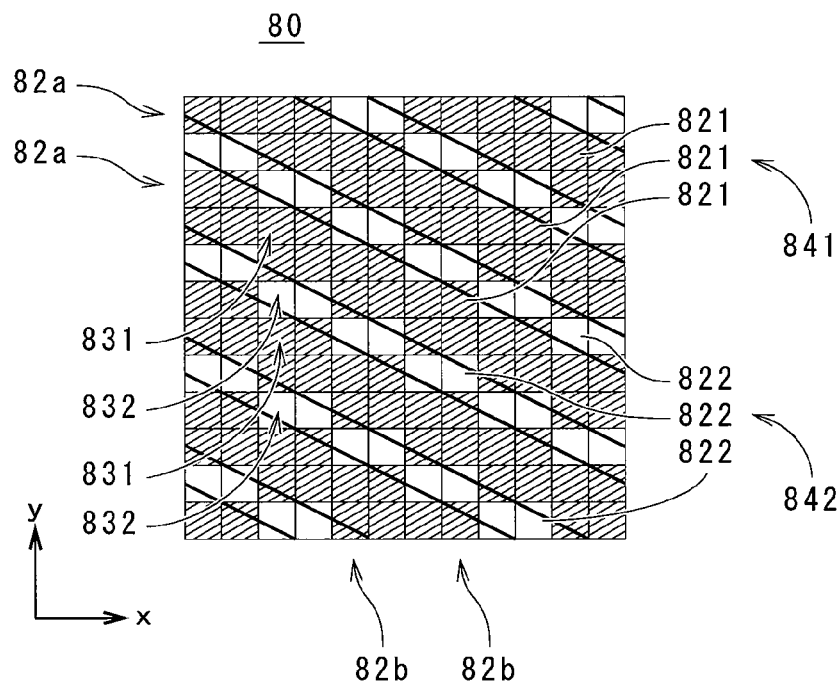
F/G. 15
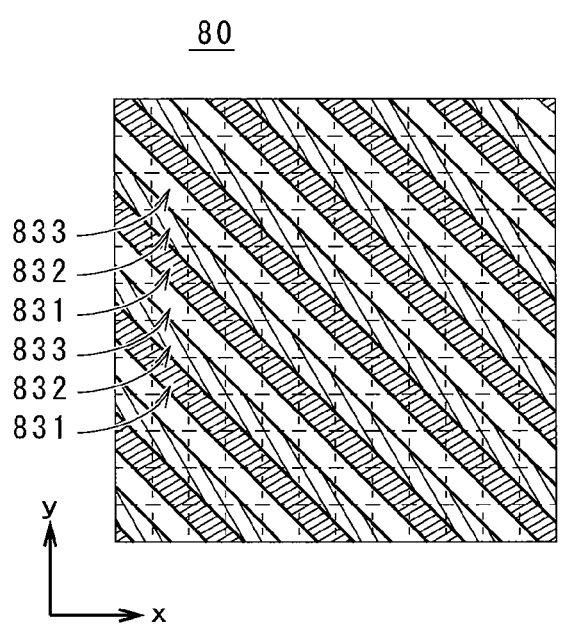

LOW (HIGHLIGHT)             HIGH (SHADOW)
GRAY LEVEL

THRESHOLD MATRIX GENERATING METHOD, IMAGE DATA GENERATING METHOD, IMAGE DATA GENERATING APPARATUS, IMAGE RECORDING APPARATUS AND RECORDING MEDIUM

CROSS-REFERENCE TO RELATED APPLICATIONS

This is a divisional application of U.S. application Ser. No. 12/115,879, filed May 6, 2008 and claims priority to JP 2007-137565, filed May 24, 2007, which are incorporated herein in their entirety.

BACKGROUND OF THE INVENTION

1. Field of the Invention

The present invention relates to a method of generating a threshold matrix which is compared with a grayscale original image in halftoning the original image, a technique for generating image data with use of the threshold matrix which is generated by the method, an image recording apparatus using the threshold matrix generated by the method, and also relates to a recording medium in which data of the threshold matrix generated by the method is recorded.

2. Description of the Background Art

Conventionally, an AM (Amplitude Modulated) screening where gray levels are represented by changing the size of dots which are regularly arranged (accurately, the dots are clusters each of which is a group of dots connecting one another), has been used in creating a halftone image for printing from an original image of gray scale (i.e., continuous tone). An FM (Frequency Modulated) screening where gray levels are represented by changing the number of dots of certain size, the dots being irregularly arranged, has been used for the original image in which moire easily arises. The FM screening is specifically used in a printer with a relatively low recording resolution of dots (e.g., an inkjet printer) in many cases.

In actually halftoning the original image, a threshold matrix where a plurality of elements are arranged in a row direction and a column direction and a threshold value is assigned to each of the elements is generated in advance and prepared, and the threshold matrix is compared with the original image. In a technique disclosed in Japanese Patent Gazette No. 2622429 (Document 1) which is a technique for generating the threshold matrix, an image is generated by applying a blue noise filter to a binary dot profile representing an arrangement of dots in a gray level and a position where a dot should be added in the dot profile is specified on the basis of a gray level of each pixel in a differential image between the image and the original dot profile, to generate a dot profile in the next gray level of the above gray level. This process is repeated to acquire a dot profile in each gray level and thereby, a blue noise mask (threshold matrix) is generated.

In an inkjet printer which performs printing by moving a head in a predetermined scan direction, the head having a plurality of outlets arranged in a width direction perpendicular to the scan direction, there is a case where streak unevenness (hereinafter, referred to as "longitudinal streak") extending in the scan direction appears in a printed halftone image (printed image) because of variations in ejection directions of inks from the plurality of outlets, or the like. When a halftone image is generated with use of the threshold matrix with isotropy in Document 1, the longitudinal streak easily appears in a middle grayscale range in the halftone image. On the other hand, Japanese Patent Application Laid-Open No. 2006-14271 (Document 2) discloses a technique for suppressing appearance of longitudinal streak or graininess in a color printed image printed with use of a threshold matrix, where threshold matrixes of color components are generated so that growing of halftone dot areas with increase of gray level in one color component in the original image shows different directionality (directivity) from another color component. The scan direction in a printer normally corresponds to the row direction or the column direction in a threshold matrix.

In the threshold matrix generated by the technique of Document 2, however, since the halftone dot areas grow (i.e., clusters become larger) from a plurality of base points, which are randomly arranged, with increase of gray level, the density of clusters is inevitably decreased (becomes coarse) to decrease the reproduction in the halftone image of thin lines, characters and the like in the original image. For this reason, required is a novel threshold matrix (especially, in a printer with a low resolution) which is capable of reducing graininess in a halftone image with directionality in a direction tilted relatively to (directions corresponding to) the row and column directions, and further improving the reproduction of thin lines, characters and the like.

SUMMARY OF THE INVENTION

The present invention is intended for a threshold matrix generating method of generating a threshold matrix which is compared with a grayscale original image in halftoning the original image. It is an object of the present invention to generate a threshold matrix which is capable of reducing graininess in a halftone image with directionality in a direction tilted relatively to a row direction and a column direction, and further improving the reproduction of thin lines, characters and the like.

According to one preferred embodiment of the present invention, the threshold matrix generating method comprises the steps of: a) sequentially assigning a plurality of linear areas, which are arranged in an arrangement direction without spaces in a matrix area, to a plurality of element groups along the arrangement direction, the matrix area being an area where a threshold matrix is generated and a plurality of elements are arranged in a row direction and a column direction, each of the plurality of linear areas extending in a tilt direction tilted relatively to the row direction and the column direction, the arrangement direction being perpendicular to the tilt direction, the plurality of element groups corresponding to a plurality of grayscale ranges acquired by dividing a whole grayscale range; b) specifying arbitrary one element in each element group to change the element to a specified element and subsequently repeating a process of changing another element in the element group to a specified element, the element being farthest from specified elements in the element group, on the premise of spatial repetition of the threshold matrix in halftoning of an original image, or repeating the process in accordance with a predetermined condition, to determine a turn-on order in which halftone dots are added to elements in the element group in accordance with increase in gray level in a grayscale range corresponding to the element group or a turn-off order in which halftone dots are removed from elements in the element group in accordance with decrease in gray level in the grayscale range; and c) determining a threshold value of each element in the matrix area in accordance with a turn-on order(s) and/or a turn-off order(s) for the plurality of element groups.

According to another preferred embodiment of the present invention, the threshold matrix generating method comprises the steps of: a) assigning a plurality of stripe pattern areas, which are set in a matrix area and cross one another, to one of two element groups which correspond to two grayscale ranges and assigning remaining areas to the other of the two element groups, the matrix area being an area where a threshold matrix is generated and a plurality of elements are arranged in a row direction and a column direction, the plurality of stripe pattern areas being tilted relatively to the row direction and the column direction, the two grayscale ranges being acquired by dividing a whole grayscale range; b) specifying arbitrary one element in each element group to change the element to a specified element and subsequently repeating a process of changing another element in the element group to a specified element, the element being farthest from specified elements in the element group, on the premise of spatial repetition of the threshold matrix in halftoning of an original image, or repeating the process in accordance with a predetermined condition, to determine a turn-on order in which halftone dots are added to elements in the element group in accordance with increase in gray level in a grayscale range corresponding to the element group or a turn-off order in which halftone dots are removed from elements in the element group in accordance with decrease in gray level in the grayscale range; and c) determining a threshold value of each element in the matrix area in accordance with a turn-on order(s) and/or a turn-off order(s) for the two element groups.

According to the present invention, it is possible to reduce graininess in a halftone image with directionality in a direction(s) tilted relatively to the row direction and the column direction, and further to improve the reproduction of thin lines, characters, and the like.

According to an aspect of the present invention, a threshold value representing absence of a dot is assigned to each of elements with larger numbers in the turn-on order or each of elements with smaller numbers in the turn-off order, in an element group corresponding to a grayscale range including a gray level at the end on a shadow side, in the step c). It is thereby possible to suppress occurrence of deformation of characters or the like in the halftone image.

According to another aspect of the present invention, the matrix area corresponds to one color component, and the steps a) to c) are performed in a matrix area of another color component which is different from the matrix area of one color component, to generate a threshold matrix of another color component which has a different size or a different pattern of element groups from the threshold matrix of one color component. As a result, it is possible to suppress occurrence of moire caused by interference of halftone images of a plurality of color components.

The present invention is also intended for an image data generating method and an image data generating apparatus for generating image data, an image recording apparatus, and still also intended for an electronic apparatus-readable recording medium in which data of a threshold matrix is recorded, the threshold matrix being compared with a grayscale original image in halftoning the original image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a view showing still another example of the first and second element groups;
FIG. 15 is a view showing linear areas in a matrix area.

DESCRIPTION OF THE PREFERRED EMBODIMENTS

Figure 1:
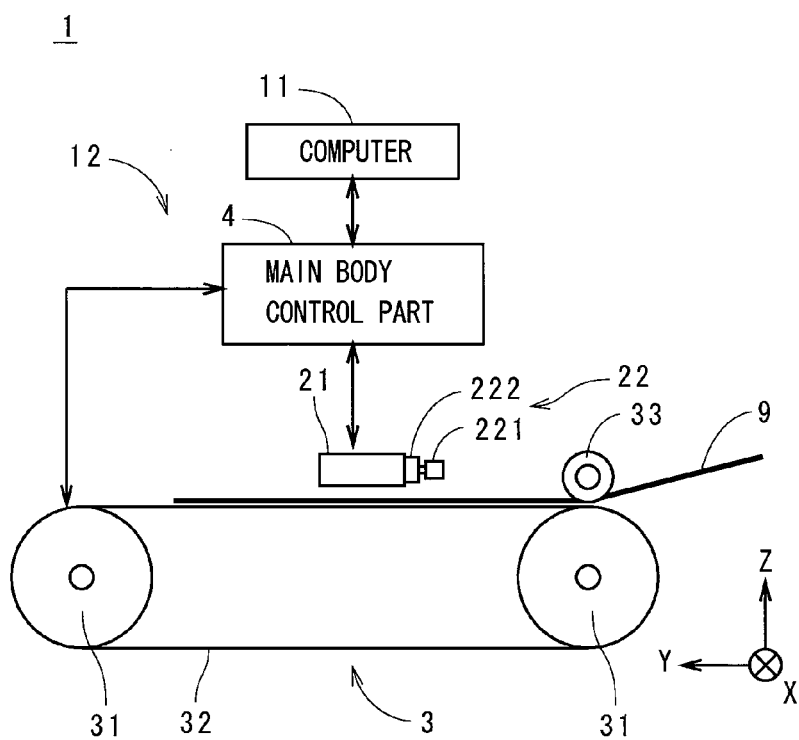
FIG. 1 is a view showing a constitution of a printer in accordance with the first preferred embodiment.

FIG. 1 is a view showing a construction of an inkjet printer 1 in accordance with the first preferred embodiment of the present invention. The printer 1 is an image recording apparatus for recording images of a plurality of color components on a printing paper 9 where the images are overlapped on the printing paper 9. A main body 12 of the printer 1 has a head 21 for ejecting fine droplets of ink onto the printing paper 9, a head moving mechanism 22 for moving the head 21 in the X direction of FIG. 1 along the printing paper 9, a feeder 3 for moving the printing paper 9 toward the Y direction perpendicular to the X direction under the head 21, and a main body control part 4 which is connected to the head 21, the head moving mechanism 22, and the feeder 3. A computer 11, which has a CPU for performing various computations, a memory for storing various information and the like, is connected to the main body control part 4. In the printer 1, the main body 12 receives a signal from the computer 11 and prints a color halftone image (halftone dot image) on the printing paper 9. A film or the like may be used as a printing medium in the printer 1, as well as the printing paper 9.

The feeder 3 has two belt rollers 31 connected to a not-shown motor and a belt 32 hanging between the two belt rollers 31. The printing paper 9 is guided onto the belt 32 through a roller 33 positioned above the belt roller 31 on the (−Y) side to be held thereon and moves toward the (+Y) side together with the belt 32, passing under the head 21.

The head moving mechanism 22 is provided with a loop-like timing belt 222 which is long in the X direction, and a motor 221 reciprocally moves the timing belt 222 to thereby smoothly move the head 21 in a direction (the X direction in FIG. 1 and the direction corresponds to the width of the printing paper 9 and hereinafter, referred to as "width direction") which is perpendicular to a feeding direction (the Y direction in FIG. 1 and hereinafter, also referred to as "scan direction") of the printing paper 9 along the printing paper 9.

Figure 2:
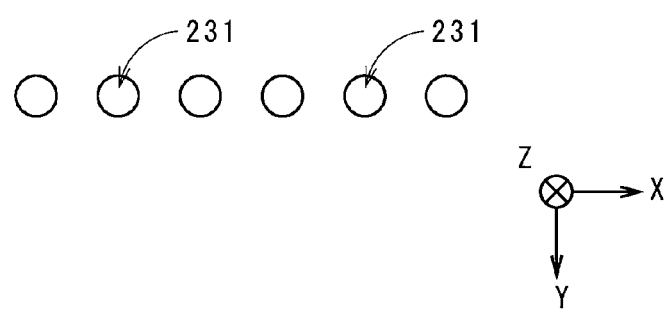
FIG. 2 is a view showing outlets.

The head 21 has a plurality of modules arranged in the Y direction and each module can eject ink of one of a plurality of colors. As shown in FIG. 2, a plurality of outlets 231 (e.g., 14400 outlets 231) each of which ejects droplets of ink onto the printing paper 9 (toward the (−Z) direction in FIG. 1) are provided in each module, and the plurality of outlets 231 are arranged at a regular pitch (e.g., at a pitch of 0.14 millimeter (mm) corresponding to 180 dpi (dot per inch)) toward the width direction in a plane parallel to the printing paper 9 (the plane parallel to the XY plane). Actually, droplets of ink are ejected from each outlet 231 by driving a piezoelectric element provided in the outlet 231. In the printer 1, the plurality of outlets 231 are arranged so as to cover the entire printing area on the printing paper 9 with respect to the width direction (i.e., to cover the range which is equal to or wider than the effective print area on the printing paper 9). In the printer 1, a plurality of outlet rows may be arranged in the scan direction in each of which the plurality of outlets 231 are arranged in the width direction. In this case, between two adjacent outlets 231 in one outlet row with respect to the width direction, one of the outlets 231 in each of the other outlet rows is positioned and a plurality of dots are formed in the width direction at a pitch which is smaller than the pitch of the outlets in each outlet row on the printing paper 9.

While printing is not performed in the printer 1, the head moving mechanism 22 disposes the head 21 at a predetermined home position and the plurality of outlets 231 are closed with lib members at the home position, to prevent the outlets 231 from being blocked by drying of the ink in the vicinities of the outlets. Though the head 21 ejects ink of black, cyan, magenta, and yellow in the preferred embodiment for convenience of description, ink of other color components such as light cyan may be ejected in the printer 1.

Figure 3:
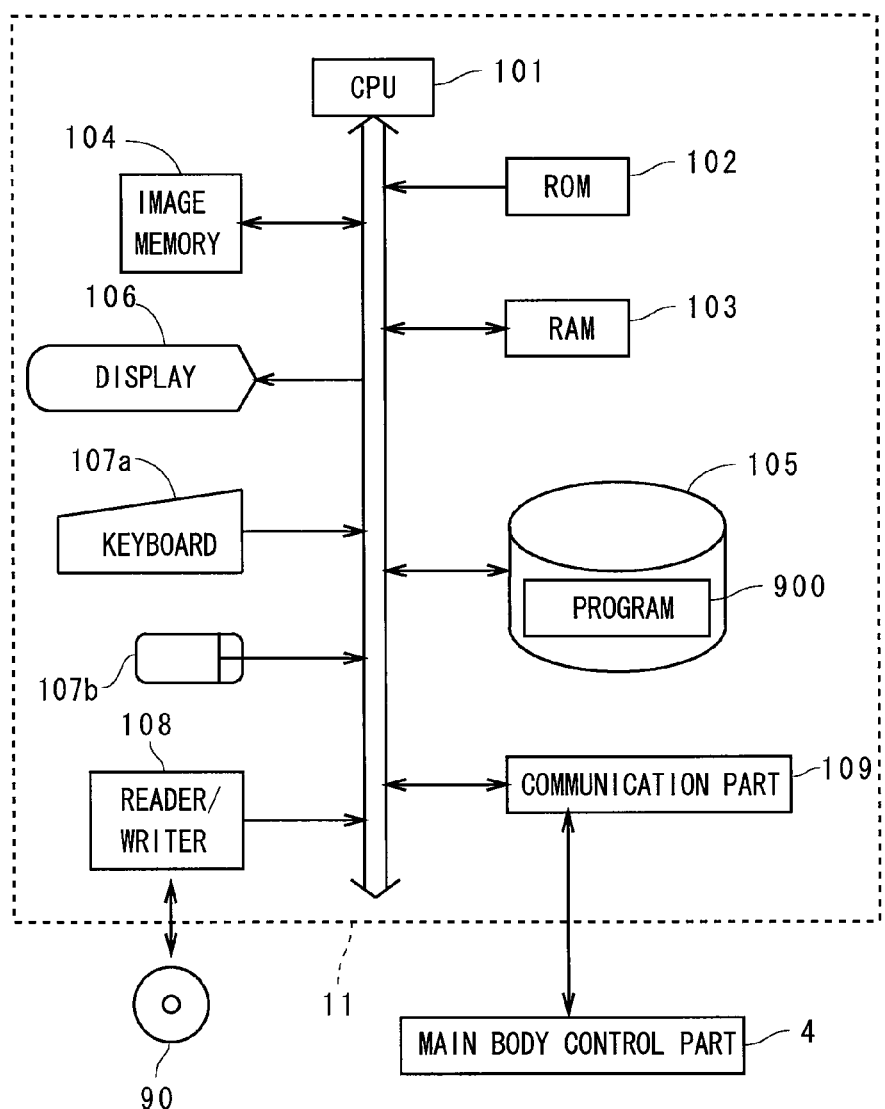
FIG. 3 is a view showing a structure of a computer.

As shown in FIG. 3, the computer 11 has a structure of general computer system where a CPU 101 for performing various computations, a ROM 102 for storing a basic program and a RAM 103 for storing various information are connected to a bus line. To the bus line, an image memory 104 for storing data of a color image (that is to say, each pixel in the image has pixel values of the plurality of color components and hereinafter, the image is referred to as an "original image") to be represented by halftoning (halftone dots), a fixed disk 105 for storing information, a display 106 for displaying various information, a keyboard 107a and a mouse 107b for receiving an input from an operator, a reader/writer 108 which reads information from a computer-readable recording medium 90 such as an optical disk, a magnetic disk or a magneto-optic disk and writes information into the recording medium 90, and a communication part 109 for making communications with the main body control part 4 are further connected through interfaces (I/F) as appropriate.

In the computer 11, a program 900 is read out from the recording medium 90 through the reader/writer 108 in advance and stored in the fixed disk 105. The program 900 is copied in the RAM 103, the CPU 101 performs a computation according to the program 900 in the RAM 103 (that is, the computer 11 executes the program), and the computer 11 thereby operates as a threshold matrix generating apparatus for generating threshold matrixes (dither matrixes) used in halftoning of the grayscale original image. The threshold matrixes and the data of the color original image stored in the image memory 104 are transmitted to the main body control part 4 through the communication part 109.

Figure 4:
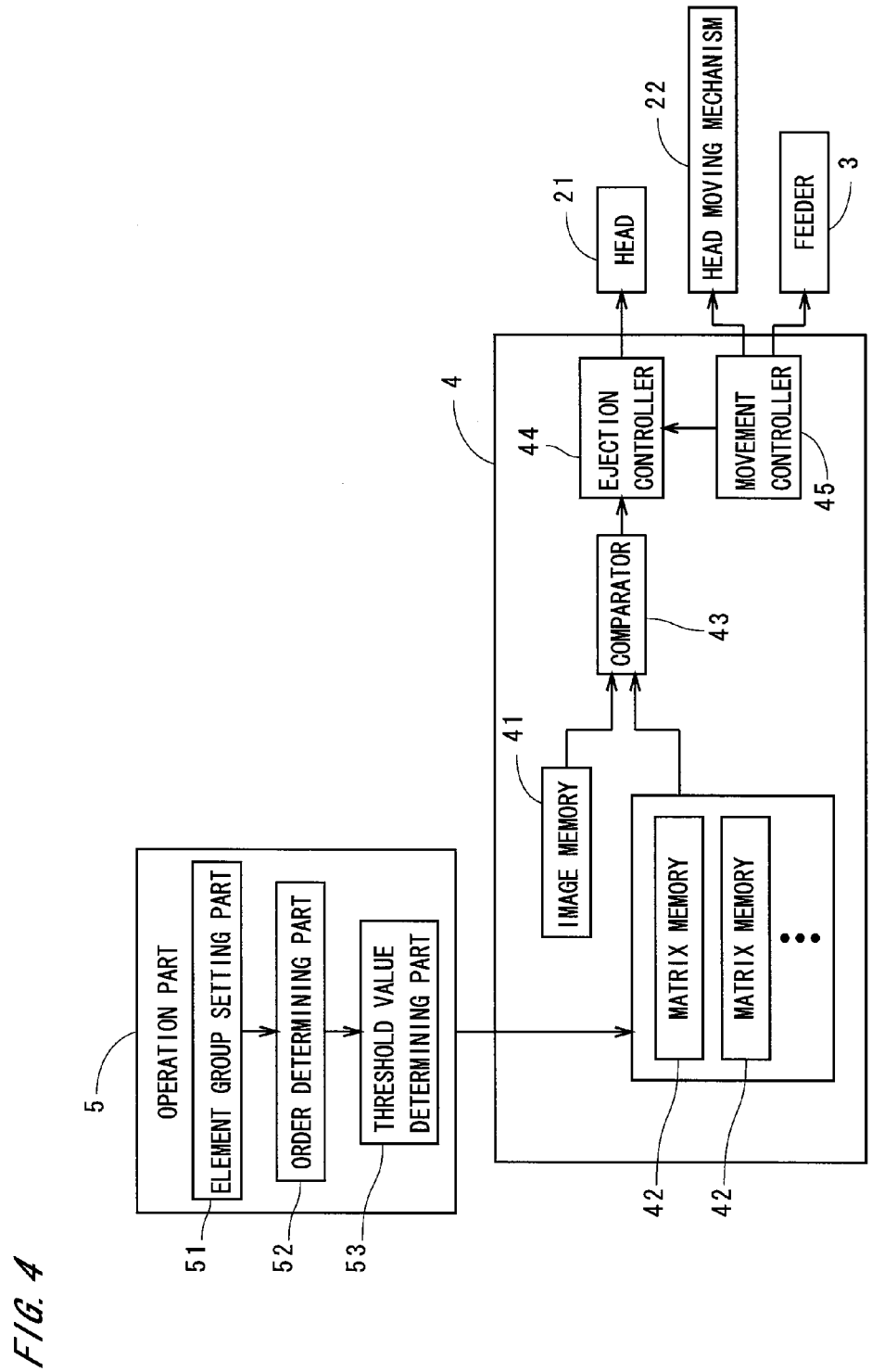
FIG. 4 is a block diagram showing a functional constitution of the printer.

FIG. 4 is a block diagram showing a functional constitution of the printer 1. Functions of an element group setting part 51, an order determining part 52, and a threshold value determining part 53 in an operation part 5 of FIG. 4 are achieved by the computer 11. The main body control part 4 has an image memory 41 for storing the data of the color original image, a plurality of matrix memories 42 (SPM (Screen Pattern Memories)) for respectively storing the threshold matrixes of the plurality of color components, a comparator 43 (halftoning circuit) for comparing the grayscale original image with the threshold matrix for each color component, a movement controller 45 for controlling relative movement of the printing paper 9 to the head 21, and an ejection controller 44 for controlling ejection of ink from the plurality of outlets 231 of the head 21 in synchronization with the relative movement of the printing paper 9. The functions of the operation part 5 may be implemented by dedicated electric circuits, or may be partially implemented by the electric circuits.

Figure 5:
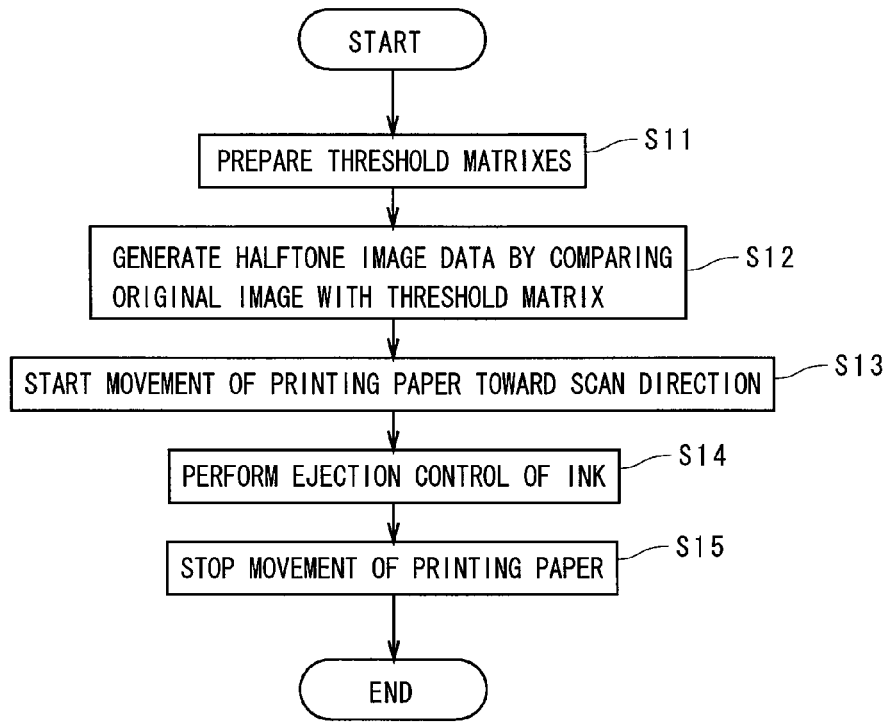
FIG. 5 is a flowchart showing an operation flow for printing in the printer.

Next discussion will be made on an operation for printing in the printer 1, referring to FIG. 5. When printing is performed in the printer 1, first, the threshold matrixes used in the actual printing are outputted to the main body control part 4 from the computer 11 (the threshold matrixes may be outputted in advance) and they are stored and prepared in the matrix memories 42 (Step S11). The color original image is also outputted to the main body control part 4 from the computer 11 and stored in the image memory 41. Though the following discussion will be made on only the threshold matrix for one color of four threshold matrixes prepared for the four colors, i.e., black, cyan, magenta and yellow, respectively, the threshold matrix for each of the other colors is used in the same manner.

Figure 6:
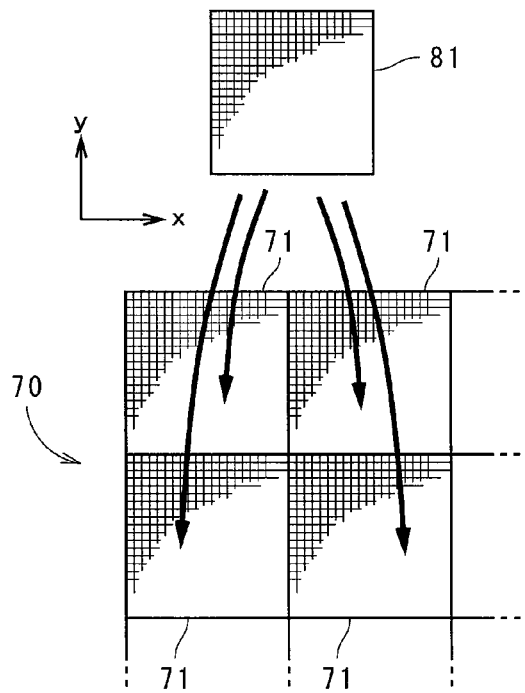
FIG. 6 is a view abstractly showing a threshold matrix and an original image.

FIG. 6 is a view abstractly showing a threshold matrix 81 and the original image 70. In the threshold matrix 81, a plurality of elements are arranged in a row direction corresponding to the width direction (the row direction is shown as the x direction in FIG. 6) and a column direction corresponding to the scan direction (the column direction is shown as the y direction in FIG. 6). Also in the original image 70, a plurality of pixels are arranged in a direction corresponding to the width direction (the direction is hereinafter referred to as the "row direction" similarly in the threshold matrix 81) and a direction corresponding to the scan direction (the direction is hereinafter referred to as the "column direction" similarly in the threshold matrix 81) (the same is applied in a halftone image which is discussed later). A process of generating the threshold matrix will be described later. In the following description, the original image is represented at gray levels of 0 to 255 in each color component, in all the respects other than specifically indicated.

Subsequently, in the comparator 43 of FIG. 4 which is an image data generator, the original image 70 stored in the image memory 41 is compared with the threshold matrix 81 for each color component which is stored in the matrix memory 42 and halftoning (i.e., a halftone dot meshing) is thereby performed on the original image 70, to generate halftone image data (hereinafter, also simply referred to as "halftone image") used for printing in the printer 1 (Step S12).

Here, halftoning of the original image 70 is discussed. In halftoning of the original image 70, as shown in FIG. 6, the original image 70 is divided into a large number of areas having the fixed size and repeat areas 71 each of which serving as a unit in halftoning are set. Each matrix memory 42 has a memory area corresponding to one repeat area 71 and a threshold value is set to each address (coordinates) of the memory area to store the threshold matrix 81. Conceptually, each repeat area 71 of the original image 70 and the threshold matrix 81 for each color component are superposed and a pixel value of the color component of each pixel in the repeat area 71 is compared with a threshold value in the threshold matrix 81 corresponding to the pixel value, to thereby determine whether or not writing (formation of a dot of the color) should be performed on the position of the pixel on the printing paper 9.

Actually, a pixel value of one pixel in the original image 70 is read out with respect to each color component from the image memory 41, on the basis of an address signal outputted from an address generator of the comparator 43 in FIG. 4. An address signal representing a position in the repeat area 71 corresponding to the pixel in the original image 70 is also generated in the address generator, one threshold value in the threshold matrix 81 of each color component is specified and read out from the matrix memory 42. The pixel value from the image memory 41 and the threshold value from the matrix memory 42 are compared for each color component in the comparator 43, to determine a pixel value of the position (address) of the pixel in a binary halftone image (outputted image) of each color component. Therefore, looking at one color component, in the grayscale original image 70 shown in FIG. 6, for example, a pixel value "1" is assigned (i.e., a dot is set) at each position where a pixel value is larger than the threshold values of the threshold matrix 81 corresponding to the pixel value, and a pixel value "0" is assigned (i.e., a dot is not set) at each of remaining pixels. In this way, in the main body control part 4, halftoning is performed on the original image 70 with using the threshold matrix 81 to generate the halftone image data which represents ON/OFF of ejection of ink from the plurality of outlets 231 in printing discussed later.

In the printer 1 of FIG. 1, when a part of the halftone image data which is first printed is generated for each color, movement of the printing paper 9 toward the scan direction is started by the feeder 3 which is driven by the movement controller 45 (Step S13) and in parallel with the above process of halftoning (generating process of the halftone image data), ejection of ink from the plurality of outlets 231 included in each module of the head 21 is controlled by the ejection controller 44 in synchronization with movement of the printing paper 9 (Step S14).

Since the halftone image is printed on the printing paper 9, the plurality of pixels in the halftone image are considered to be arranged on the printing paper 9. The number of positions in the row direction of the halftone image is the same as that of the plurality of outlets 231 (or smaller than that of the plurality of outlets 231) of each module in the head 21, and the plurality of positions in the row direction are associated with the plurality of outlets 231, respectively. In the ejection controller 44, in parallel with relative movement of the head 21 to the printing paper 9, when a pixel value in the halftone image corresponding to an ejection position of each outlet 231 on the printing paper 9 is "1", a dot is formed on the ejection position, and when the pixel value in the halftone image is "0", a dot is not formed on the ejection position. In this way, with respect to each component of black, cyan, magenta, and yellow, ejection of ink from the plurality of outlets 231 is controlled in accordance with the pixel values in the halftone image corresponding to the ejection positions of the plurality of outlets 231 relative to the printing paper 9, while moving the plurality of ejection positions on the printing paper 9, which individually correspond to the plurality of outlets 231, relatively to the printing paper 9.

In the printer 1, operations for recording halftone images of black, cyan, magenta and yellow on the printing paper 9 while generating the halftone images, are performed in parallel, and a color halftone image (printed image) representing the color original image is printed on the printing paper 9. After the whole halftone image is printed on the printing paper 9, movement of the printing paper 9 is stopped to complete the printing operation in the printer 1 (Step S15).

Next discussion will be made on a generating process of the threshold matrix 81 used in printing in the printer 1 with reference to FIG. 7.

In the element group setting part 51 of the operation part 5, first, set is a matrix area which stores a threshold matrix of one color and is defined in the row direction corresponding to the width direction and the column direction corresponding to the scan direction.

Figure 8:
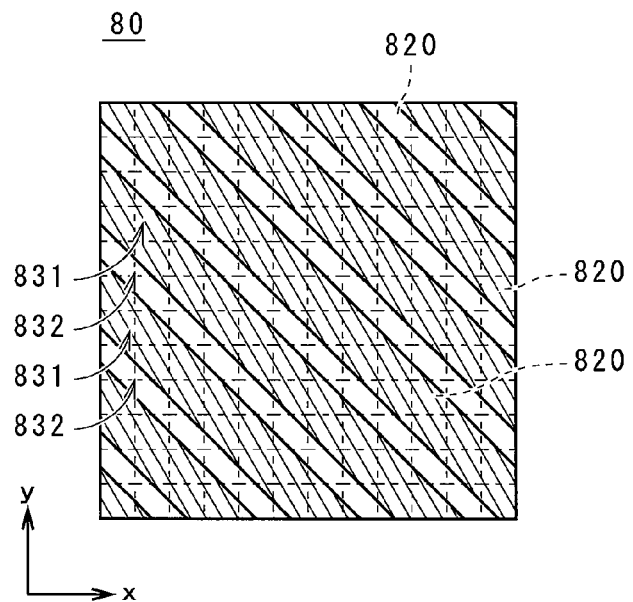
FIG. 8 is a view showing a matrix area.

FIG. 8 is a schematic view of a matrix area 80. In the matrix area 80 where the threshold matrix 81 is set by a later-discussed process, a plurality of elements 820 (shown by broken-line rectangles in FIG. 8) are arranged at the same pitch (hereinafter, referred to as "element pitch") in the row direction (the x direction in FIG. 8) and the column direction (the y direction in FIG. 8) which are orthogonal to each other, as shown in FIG. 8. Subsequently, a plurality of linear areas each of which extends in a tilt direction tilted by 45 degrees relatively to the row direction and the column direction (in the present preferred embodiment, the tilt direction is a direction which is obtained by rotating the y axis counterclockwise by 45 degrees around an axis perpendicular to the xy plane) are arranged in a direction perpendicular to the tilt direction without spaces (the direction is hereinafter, referred to as "arrangement direction"). In this case, the plurality of linear areas include two kinds of linear areas 831, 832 whose widths in the arrangement direction are different from each other. The linear area 831 of one kind (the hatched area in FIG. 8) whose width is the same as the length of the diagonal line of the element 820 and the linear area 832 of the other kind (the non-hatched area in FIG. 8) whose width is a half of the width of the linear area 831 are alternatively arranged in the arrangement direction (i.e., each of the linear area 831 and the linear area 832 is arranged periodically). A group of a plurality of elements 820 whose centers are included in the plurality of linear areas 831 is treated as a first element group and a group of a plurality of elements 820 whose centers are included in the plurality of linear areas 832 is treated as a second element group. Looking at an edge of each linear area 831, 832 along the tilt direction, the plurality of linear areas 831, 832 are considered as areas which are obtained by dividing the matrix area 80 by a plurality of straight lines along the tilt direction, the lines being arranged in the arrangement direction perpendicular to the tilt direction.

Figure 9:
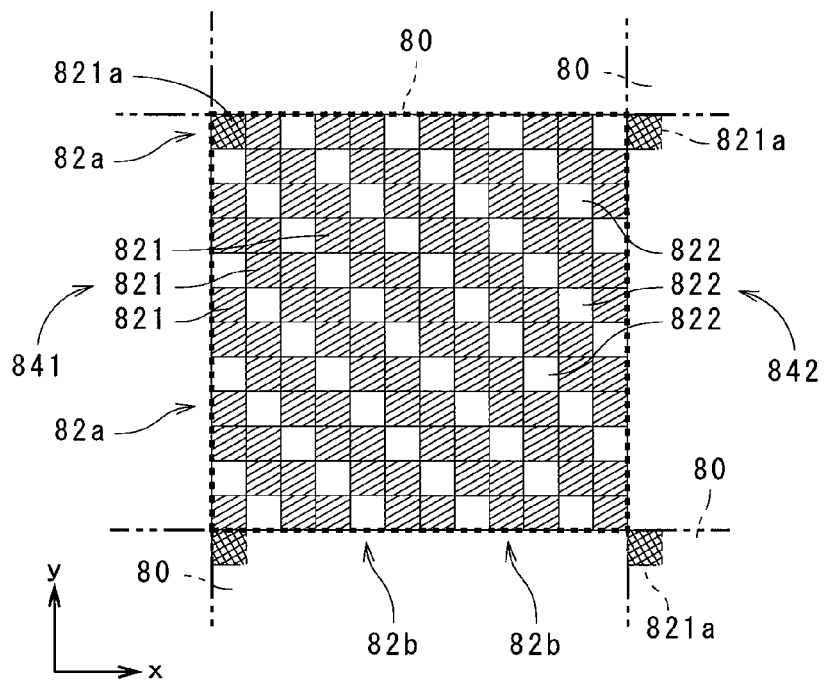
FIG. 9 is view showing first and second element groups.

FIG. 9 is a view showing the first element group 841 and the second element group 842. In FIG. 9, the reference number 821 is assigned to each of elements included in the first element group 841 (hatched elements in FIG. 9) and the reference number 822 is assigned to each of elements included in the second element group 842 (non-hatched blank elements in FIG. 9). In the matrix area 80 of FIG. 9, a plurality of elements arranged in the row direction at each of positions in the column direction is considered as an element row 82a and in each element row 82a, one element 822 included in the second element group 842 is arranged at an interval three times the element pitch (i.e., at a distance of three elements) in the row direction. In other words, in each element row 82a, two elements 821 which are included in the first element group 841, being successive in the row direction, are arranged at an interval three times the element pitch. Also, a plurality of elements arranged in the column direction at each of positions in the row direction is considered as an element column 82b and in each element column 82b, the elements 821 of the first element group 841 and the elements 822 of the second element group 842 are arranged in the same manner as the element row 82a. In the matrix area 80, since the number of elements in each of the row and column directions is multiples of 3, 2/3 of elements included in each element row 82a (or each element column 82b) is the elements 821 of the first element group 841 and 1/3 of the elements included in the element row 82a (or the element column 82b) is the elements 822 of the second element group 842.

As discussed above, in the element group setting part 51, the plurality of linear areas 831, 832 each of which extends in the tilt direction are arranged in the arrangement direction without spaces in the matrix area 80 and the plurality of linear areas 831, 832 are sequentially assigned to the plurality of element groups 841, 842 along the arrangement direction, to thereby set the plurality of element groups 841, 842 in the matrix area 80 (Step S21).

As discussed later, threshold values corresponding to changes of gray levels in a grayscale range on a highlight side out of two grayscale ranges which are acquired by dividing the whole grayscale range of the original image 70, are assigned to the elements 821 included in the first element group 841, and threshold values corresponding to changes of gray levels in a grayscale range on a shadow side out of the two grayscale ranges, are assigned to the elements 822 included in the second element group 842. As described earlier, the first element group 841 includes 2/3 of elements in the matrix area 80 and the second element group 842 includes 1/3 of the elements in the matrix area 80. Therefore, the first element group 841 can be expressed as a highlight area corresponding to a grayscale range of 0 to 67% and the second element group 842 can be expressed as a shadow area corresponding to a grayscale range of 67 to 100%.

In the order determining part 52, the first element group 841 out of the first and second element groups 841, 842 is specified as an element group to be processed (hereinafter, referred to as "target element group") (Step S22) and arbitrary one element 821 in the target element group 841 is specified (Step S23). In this case, an element 821a at the end on the (−x) side and at the end on the (+y) side is specified and a dot is set at the element 821a as shown by a cross-hatched rectangle in FIG. 9. In the process for the first element group 841, to set a dot at an element 821 means that the element 821 becomes a specified element.

Subsequently, an evaluation value is calculated for each element 821 in the target element group 841 with using a predetermined evaluation function to specify one element 821 which is farthest from existing dots in the target element group 841 and a dot is added to the element 821 in the target element group 841 (i.e., the element 821 is changed to a specified element) (Step S24). In this time, since spatial repetition of the threshold matrix 81 in halftoning of the original image 70 is premised (see FIG. 6), it is considered that the element 821a repeatedly exists in matrix areas 80 (shown by double-dashed lines in FIG. 9) which are assumed to exist in 8-neighborhoods of the central matrix area 80 shown by thick broken lines in FIG. 9, as well as the central matrix area 80 (in FIG. 9, each of the elements 821a in the matrix areas 80 assumed to exist in the 8-neighborhoods of the central matrix area 80 is shown by a cross-hatched rectangle which is outlined by a double-dashed line). As discussed later, the process of Step S24 is repeatedly performed a plurality of times and a plurality of new dots are added to the elements 821 in the target element group 841. An evaluation value Ed. (xd, yd) of each element 821 in the coordinates (xd, yd) of the matrix area 80 in obtaining an element 821 to which the dot is set in the nth setting (the nth new dot is set), is obtained by Eq. 1 where r is a number of the central matrix area 80 and the matrix areas 80 assumed in the 8-neighborhoods of the central matrix area 80 and $xd_{mr}$ and $yd_{mr}$ are respectively positions in the x direction and the y direction of the mth dot which is set in the rth matrix area 80.

$$Ed_n(xd, yd) = \sum_{m=0}^{n-1} \sum_{r=0}^{8} \frac{1}{(xd - xd_{mr})^2 + (yd - yd_{mr})^2}$$ Eq. 1

Actually, in the evaluation function of Eq. 1, a position $xd_{mr}$ in the x direction of the mth dot which is set in the rth matrix area 80 is obtained by adding or subtracting the size in the x direction of the matrix area 80 in accordance with a number of the matrix area 80 (i.e., in accordance with a relative position of the matrix area 80 to the central matrix area 80), to/from a position in the x direction of the dot in the central matrix area 80 corresponding to the mth dot which is set in the rth matrix area 80, or the position $xd_{mr}$ is obtained as the same position as that in the x direction of the dot in the central matrix area 80 corresponding to the mth dot which is set in the rth matrix area 80. A position $yd_{mr}$ in the y direction is obtained by adding or subtracting the size in the y direction of the matrix area 80 in accordance with a number of the matrix area 80, to/from a position in the y direction of the dot in the central matrix area 80 corresponding to the mth dot which is set in the rth matrix area 80, or the position $yd_{mr}$ is obtained as the same position as that in the y direction of the dot in the central matrix area 80 corresponding to the mth dot which is set in the rth matrix area 80.

The evaluation value relative to each element 821 in the target element group 841 is calculated, and then an element 821 whose evaluation value is minimum is specified and a new dot is added to the element 821. Since a sum of the reciprocals of square values of distances between each element 821 in the central matrix area 80 and existing dots in the central matrix area 80 and the matrix areas 80 assumed in the 8-neighborhoods of the central matrix area 80, is obtained as the evaluation value in the evaluation function of Eq. 1, the element 821 whose evaluation value is minimum is farthest from existing dots (specified elements) on the premise of spatial repetition of the threshold matrix 81.

In this manner, in the order determining part 52, the process of Step S24 of calculating an evaluation value for each element 821 in the target element group 841 with using Eq. 1 and adding a new dot to an element 821 whose evaluation value is minimum is repeated until n in Eq. 1 becomes a value which is smaller by 1 than the number of elements of the target element group 841 in the matrix area 80 (Step S25). With this operation, determined is a turn-on order (lighting order) in which halftone dots are added to elements (to be exact, positions in a halftone image corresponding to the elements) in accordance with increase in gray level in a grayscale range of 0 to 67% (i.e., variation in gray level from 0% to 67%) corresponding to the target element group 841.

After the turn-on order for the first element group 841 is determined through the above processes of Steps S23 to S25, it is checked whether or not all element groups in the matrix area 80 become the target element group. In this case, the second element group 842 still doesn't become the target element group, so the second element group 842 is specified as the target element group (Steps S26, S22). Arbitrary one element 822 in the target element group 842 is specified and dots are set at all elements 822 excluding the element 822 (Step S23). This process is considered as a process of setting dots at all elements 822 and thereafter removing a dot of arbitrary one element 822. In the process for the second element group 842, to remove a dot from an element 822 means that the element 822 becomes a specified element.

Subsequently, an evaluation value is calculated for each element 822 in the target element group 842, and a dot of one element 822 in the target element group 842, the dot being farthest from elements 822 in each of which a dot is not set in the target element group 842, is removed (i.e., the element 822 is changed to a specified element) (Step S24). In this time, an evaluation value for each element 822 in the target element group 842 is calculated with use of the same equation as Eq. 1 used in determining the turn-on order in the target element group 841, however, $xd_{mr}$ and $yd_{mr}$ in Eq. 1 are respectively positions in the x direction and the y direction of the element 822 in the rth matrix area 80 where the dot is removed in the mth removing.

After the evaluation value relative to each element 822 in the target element group 842 is calculated, an element 822 whose evaluation value is minimum is specified to remove a dot of the element 822. In this manner, in the order determining part 52, the process of Step S24 of calculating an evaluation value for each element 822 in the target element group 842 with using Eq. 1 and removing a dot of an element 822 whose evaluation value is minimum is repeated until n in Eq. 1 becomes a value which is smaller by 1 than the number of elements of the target element group 842 in the matrix area 80 (Step S25). With this operation, determined is a turn-off order (extinction order) in which halftone dots are removed from elements (to be exact, positions in a halftone image corresponding to the elements) in accordance with decrease in gray level in a grayscale range of 67 to 100% (i.e., variation in gray level from 100% to 67%) corresponding to the target element group 842. The turn-off order and the turn-on order may be determined for the first element group 841 and the second element group 842, respectively (the same is applied in the following description). There may be a case where the second element group 842 corresponds to a grayscale range of 0 to 33% and the first element group 841 corresponds to a grayscale range of 33 to 100%.

After the turn-off order for the second element group 842 is determined, it is confirmed all element groups 841, 842 in the matrix area 80 become the target element group and the turn-on order of the first element group 841 and the turn-off order of the second element group 842 are outputted to the threshold value determining part 53 (Step S26). Subsequently, numbers of integer which increase by 1 from a value obtained by adding 1 to the maximum value of the turn-on order in the first element group 841 are sequentially assigned to all the elements 822 in the second element group 842, from one having the largest turn-off number and thereby, determined is the order (of elements in the matrix area 80) in which halftone dots are formed at pixels in a halftone image corresponding to positions of elements in the matrix area 80 in accordance with increase in gray level of the original image 70 (increase in all the range of gray levels of the original image 70) (the above order represents the order of elements in the matrix area 80 to each of which a number from 0 to (K×L−1) is assigned in a case that the matrix area 80 is constituted in K rows and L columns, and the order is hereinafter referred to as a "final turn-on order"). In a case where the original image is represented by gray levels of 256 (8 bit) from 0 to 255, the ordinal numbers in the final turn-on order are converted into the range of 0 to 254 and the converted ordinal numbers are respectively assigned to the corresponding elements as threshold values (i.e., the ordinal numbers in the final turn-on order are compressed in 255 gray levels). As discussed above, a threshold value of each element in the matrix area 80 is determined in accordance with the turn-on order(s) and/or the turn-off order(s) for the plurality of element groups 841, 842, to complete a threshold matrix 81 (Step S27).

After a threshold value of each element is determined to complete the threshold matrix 81 of one color component, a threshold matrix which is obtained by reversing the threshold matrix 81 in the x direction (i.e., the threshold matrix 81 is reversed with reference to a straight line which is parallel to the y direction, passing through the center in the x direction (the same is applied in the following description)), a threshold matrix which is obtained by reversing the threshold matrix 81 in the y direction, and a threshold matrix which is obtained by reversing the threshold matrix 81 in the x direction and further reversing it in the y direction, are prepared as threshold matrixes of the remaining three color components other than the threshold matrix 81 of one color component (the same as is applied the second preferred embodiment which is discussed later). Processes of generating the threshold matrixes of the other color components are omitted in FIG. 7. Then, the threshold matrix of each color component is stored in the corresponding matrix memory 42 in the main body control part 4 through the communication part 109 of the computer 11 and the threshold matrixes are used for printing of the original image 70 in the printer 1.

There may be a case where data of the threshold matrixes 81 is recorded in an electronic apparatus-readable/writable recording medium 90 (including a computer) by the reader/writer 108 and the recording medium 90 is read out by the main body control part 4 to store the data of the threshold matrixes 81 in the matrix memories 42. The recording medium 90 is read out by another apparatus and a halftone image may be generated with use of the threshold matrixes 81 in the apparatus.

Figure 10:
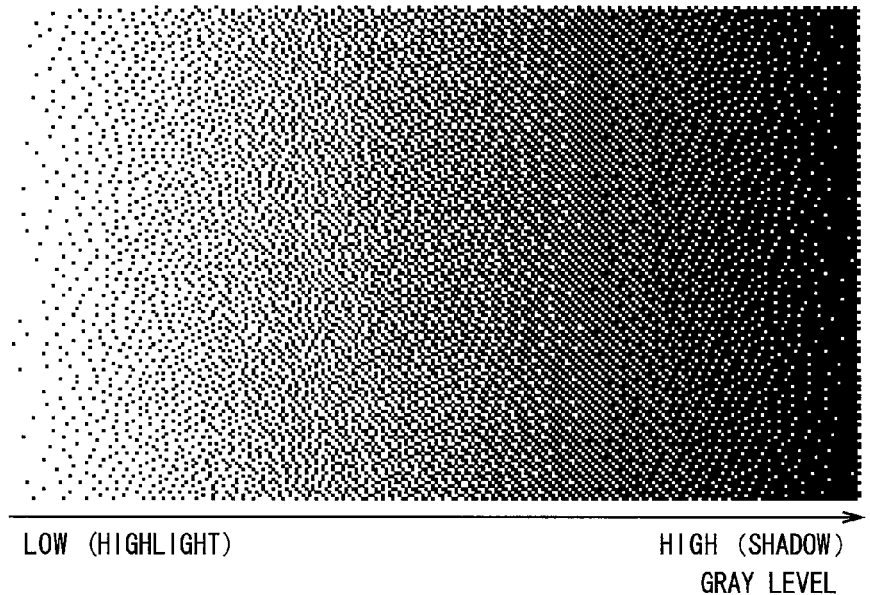
FIG. 10 is a view showing a halftone image.

FIG. 10 is a view showing a halftone image. The halftone image of FIG. 10 is generated by halftoning an image whose gray levels (values of pixels) are constant in the column direction and linearly changing from 0 to 255 in the row direction (the image is a so-called gradation image), with using the threshold matrix 81. The halftone image of FIG. 10 has directionality in a direction corresponding to the tilt direction in the matrix area 80, and the density of clusters (each of which is a group of dots connecting one another in the row or column direction) in a middle grayscale range is relatively high and graininess hardly appears in the halftone image.

As discussed above, in the printer 1, the plurality of linear areas 831 each of which extends in the tilt direction tilted relatively to the row and column directions and corresponds to the first element group 841, and the plurality of linear areas 832 each of which extends in the tilt direction like the plurality of linear areas 831 and corresponds to the second element group 842, are alternatively arranged in a direction perpendicular to the tilt direction without spaces in the matrix area 80, to thereby set the first and second element groups 841, 842 in the matrix area 80. Then, arbitrary one element is specified in each of the element groups 841, 842 and subsequently the process of specifying another element in the element group which is the element farthest from specified elements in the element group, is repeated to acquire the turn-on order in which halftone dots are added to elements in each of the element groups 841, 842 in accordance with increase in gray level in a grayscale range corresponding to the element group or the turn-off order in which halftone dots are removed from elements in the element group in accordance with decrease in gray level in the grayscale range corresponding to the element group. With this operation, it is possible to generate the threshold matrix 81 for the FM screening, the threshold matrix 81 being capable of reducing graininess (reducing granularity) in the halftone image with directionality in a direction tilted by 45 degrees relatively to the row and column directions, and further increasing the density of clusters in the middle grayscale range to improve the reproduction (reproducibility) of thin lines, characters, and the like.

Figure 11A:
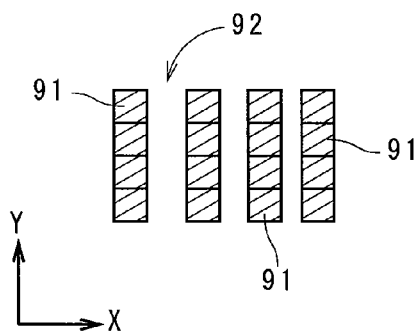
FIGS. 11A and 11B are views each showing dots formed on a printing paper in an example for comparison.

If a threshold matrix which has directionality in the scan direction corresponding to the column direction in a halftone image is used in printing, as schematically shown in FIG. 11A, dots 91 (they are shown by hatched rectangles in FIG. 11A and the same is applied to FIGS. 11B and 12 discussed later) tend to be arranged in the scan direction (the Y direction) and be formed in the width direction (the X direction) with spaces in a printed image printed on the printing paper 9. In this case, if ejection directions or the like of the droplets from the plurality of outlets 231 in the head 21 differ (i.e., the accuracy of dot recording position in the width direction is low), a portion where a space between adjacent dots 91 in the width direction is greater (a portion shown by the reference sign 92 in FIG. 11A) appears in the printed image to cause a longitudinal streak extending in the scan direction in the printed image.

Figure 11B:
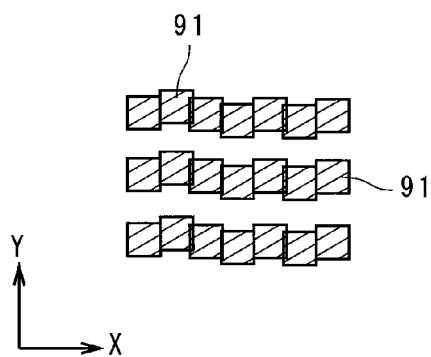

Also, if a threshold matrix which has directionality in the width direction corresponding to the row direction in a halftone image is used in printing, dots 91 tend to be arranged in the width direction and be formed in the scan direction with spaces in a printed image printed on the printing paper 9. In this case, if ejection speeds or the like of the droplets from the plurality of outlets 231 in the head 21 differ (i.e., the accuracy of dot recording position in the scan direction is low), graininess appears in the printed image as shown in FIG. 11B.

Figure 12:
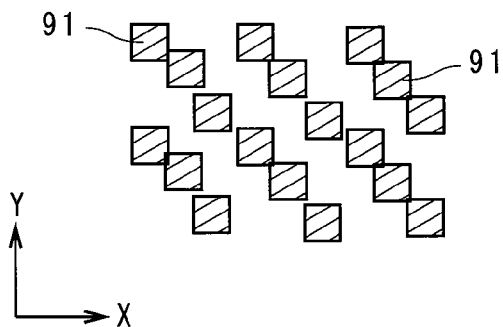
FIG. 12 is a view showing dots formed on a printing paper.

On the other hand, since the threshold matrix 81 generated in the present preferred embodiment has directionality in a direction which is tilted relatively to the row and column directions in the halftone image, dots 91 tend to be arranged in a direction tilted relatively to the width and scan directions as shown in FIG. 12. As a result, it is possible to suppress occurrence of the longitudinal streak in a printed image even if the accuracy of dot recording position in the width direction is low, and further to suppress appearance of graininess in a printed image even if the accuracy of dot recording position in the scan direction is low.

Figure 13:
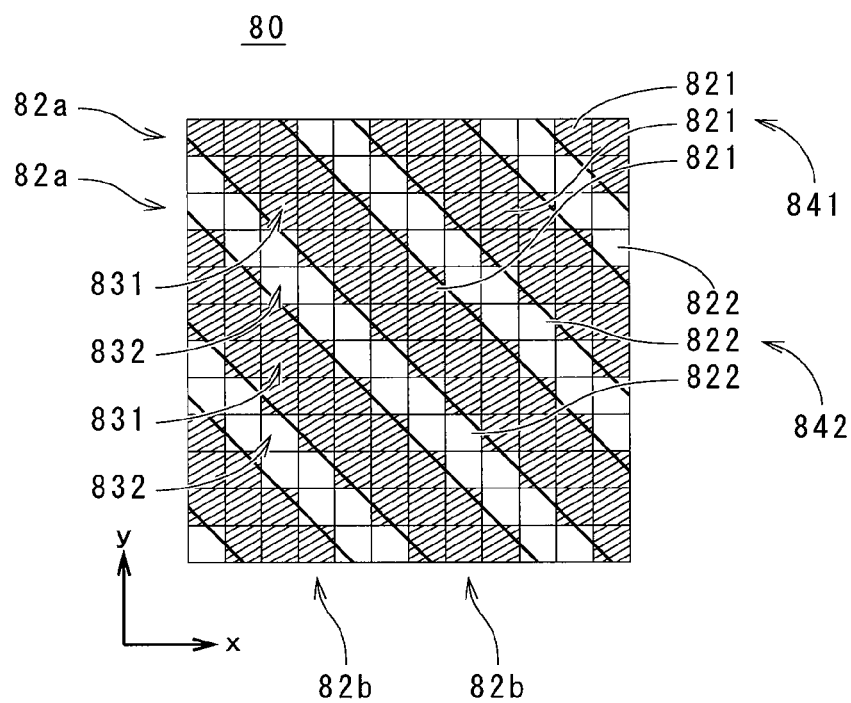
FIG. 13 is a view showing another example of the first and second element groups.

A plurality of linear areas 831, 832 may be set in various manners in a matrix area 80. For example, in the example shown in FIG. 13 (a part of a matrix area 80 is shown in FIG. 13 and the same is applied to FIGS. 14 to 16 and FIGS. 18 to 23 discussed later), each width in the arrangement direction of a plurality of linear areas 831, 832 is made wider than that shown in FIG. 8 (the border between linear areas 831, 832 is shown by a thick line in FIG. 13 and the same is applied to FIGS. 14, 15, 18 to 20 and 22 discussed later). Actually, the width of the linear area 831 is made to 1.5 times the length of the diagonal line of the element and the width of the linear area 832 is made to be equal to the length of the diagonal line of the element. In each element row 82a, successive three elements 821 (hatched elements in FIG. 13) are included in a first element group 841 and successive two elements 822 (blank elements in FIG. 13) which are adjacent to the elements 821 are included in a second element group 842 (an element(s) close to an end portion of each element row 82a is excluded). In each element column 82b, successive three elements 821 are included in the first element group 841 and successive two elements 822 which are adjacent to the elements 821 are included in the second element group 842 (an element(s) close to an end portion of each element column 82b is excluded). The first element group 841 corresponds to a grayscale range of 0 to 60% and the second element group 842 corresponds to a grayscale range of 60 to 100%.

As described above, in each of the element row 82a and the element column 82b in the matrix area 80 shown in FIG. 13, successive three elements 821 included in the first element group 841 and successive two elements 822 included in the second element group 842 are arranged at an interval five times the element pitch in the row direction or the column direction. In a threshold matrix 81 derived from the matrix area 80 shown in FIG. 13, the density of clusters in a halftone image is slightly decreased in the middle grayscale range (especially, in the vicinities of a gray level of 60% where an area to which dot is added is switched from the first element group 841 to the second element group 842), in comparison with the threshold matrix 81 derived from the matrix area 80 shown in FIG. 9. However, if the recording stability in a case that any dot is not formed around a dot in the printer 1 is low, it is possible to print the halftone image with relatively high reproduction.

In a case where the accuracy of dot recording position in the scan direction is high in the printer 1, a plurality of linear areas 831, 832 each of which extends in a tilt direction tilted by an angle (about 63 degrees in FIG. 14) which is greater than 45 degrees and smaller than 90 degrees relatively to the column direction may be set in a matrix area 80 as shown in FIG. 14. In the matrix area 80 shown in FIG. 14, the width in the arrangement direction of the linear area 831 corresponding to a first element group 841 is made to be twice that of the linear area 832 corresponding to a second element group 842. In each element row 82a, successive four elements 821 (hatched elements in FIG. 14) included in the first element group 841 and successive two elements 822 (blank elements in FIG. 14) included in the second element group 842 are arranged at an interval six times the element pitch in the row direction. In each element column 82b, successive two elements 821 included in the first element group 841 and one element 822 included in the second element group 842 are arranged at an interval three times the element pitch in the column direction. The first element group 841 corresponds to a grayscale range of 0 to 67% and the second element group 842 corresponds to a grayscale range of 67 to 100%.

Since a threshold matrix 81 derived from the matrix area 80 shown in FIG. 14 has directionality in a direction forming an angle which is greater than 45 degrees relatively to the scan direction in a printed image, even if the accuracy of dot recording position in the width direction is low, it is possible to further suppress occurrence of the longitudinal streak in the printed image in comparison with the threshold matrix 81 derived from the matrix area 80 shown in FIG. 9.

Figure 16:
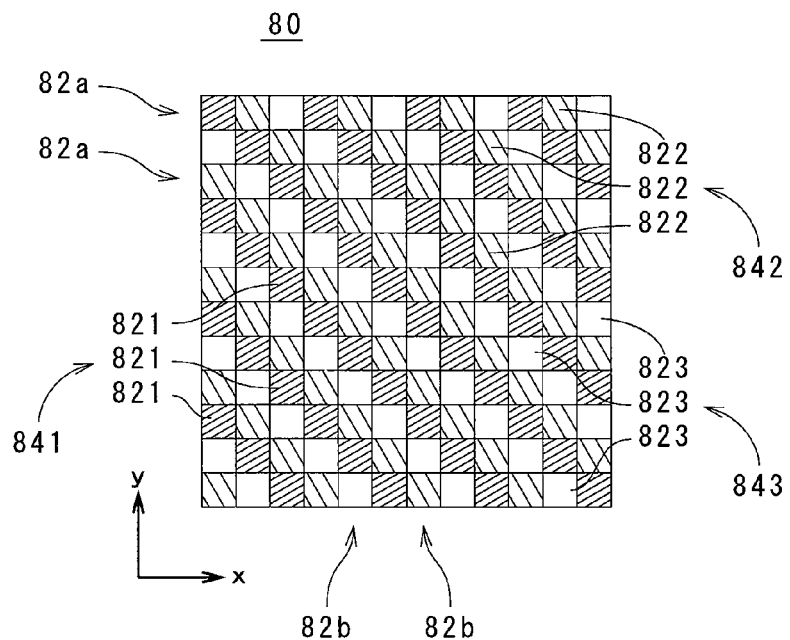
FIG. 16 is a view showing first to third element groups.

Though, in the examples of FIGS. 9, 13 and 14, the threshold matrix 81 is easily generated by setting only the two element groups 841, 842 in the matrix area 80, three element groups may be set in a matrix area 80 to generate a threshold matrix 81. For example, in the example shown in FIG. 15, a plurality of linear areas 831, 832, 833 each of which extends in the tilt direction tilted by 45 degrees relatively to the row direction and the column direction are arranged in the arrangement direction perpendicular to the tilt direction without spaces. Each width in the arrangement direction of the plurality of linear areas 831 to 833 is made to a half of the length of the diagonal line of the element, and the plurality of linear areas 831 to 833 are sequentially assigned to a first element group, a second element group and a third element group along the arrangement direction. In FIG. 15, the linear areas 831 assigned to the first element group are provided with parallel lines where the distance between lines is smaller, the linear areas 832 assigned to the second element group are provided with parallel lines where the distance between lines is larger, and the linear areas 833 assigned to the third element group are not provided with diagonal lines (the same is applied in later-discussed elements 821, 822, 823 in FIG. 16). As shown in FIGS. 15 and 16, elements 821 whose centers are included in the linear areas 831 are treated as elements belonging to a first element group 841, elements 822 whose centers are included in the linear areas 832 are treated as ones belonging to a second element group 842, and elements 823 whose centers are included in the linear areas 833 are treated as ones belonging to a third element group 843.

In a matrix area 80 shown in FIG. 16, in each element row 82a, the element 821 included in the first element group 841, the element 822 included in the second element group 842, and the element 823 included in the third element group 843 are sequentially arranged in the row direction. Also in each element column 82b, the element 821 in the first element group 841, the element 822 in the second element group 842, and the element 823 in the third element group 843 are sequentially arranged in the column direction. Therefore, the first element group 841 corresponds to a grayscale range of 0 to 33%, the second element group 842 corresponds to a grayscale range of 33 to 67%, and the third element group 843 corresponds to a grayscale range of 67 to 100%. The first to third element groups 841 to 843 are represented as a highlight area, an intermediate area, and a shadow area, respectively.

Figure 7:
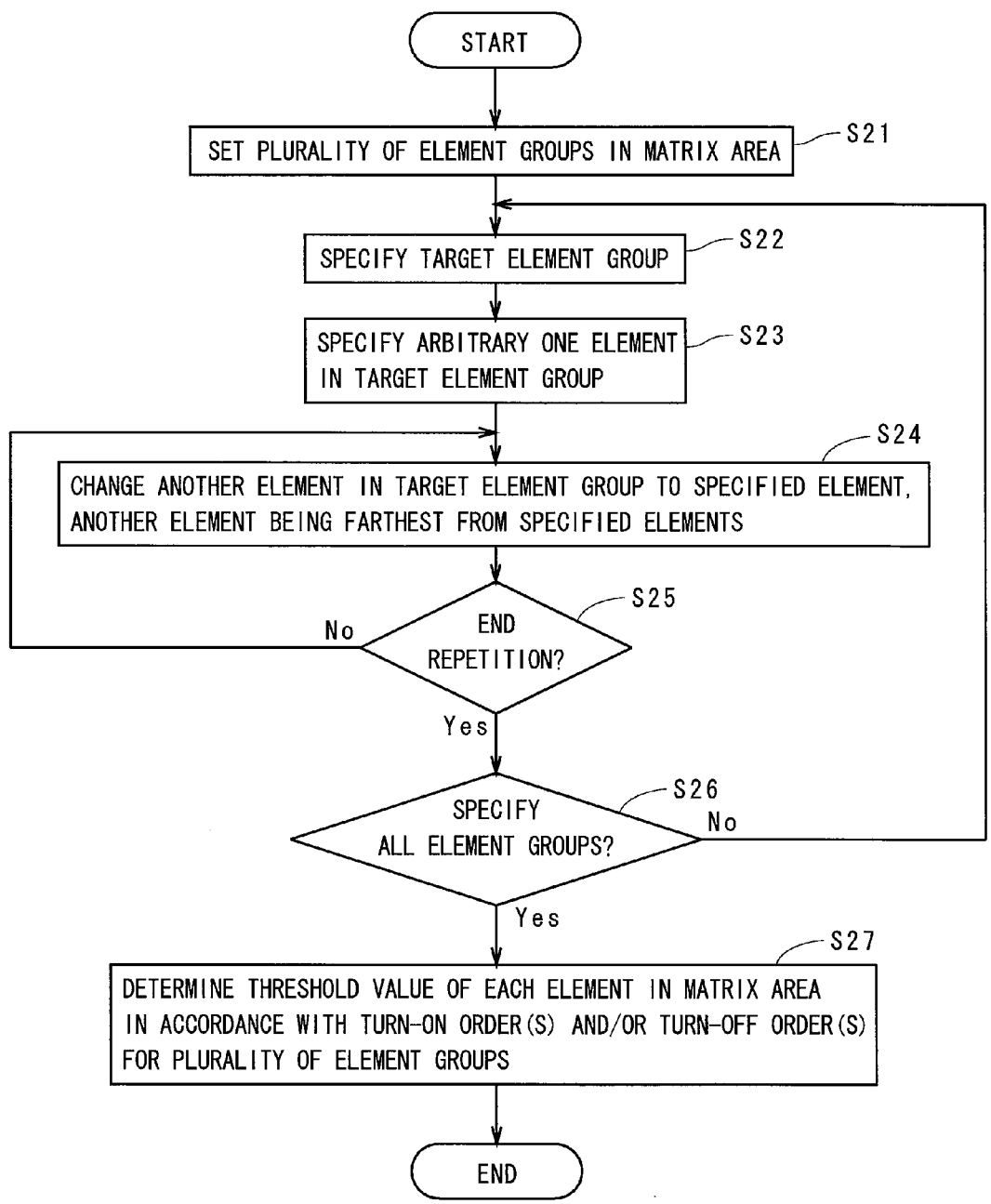
FIG. 7 is a flowchart showing a process flow for generating the threshold matrix.

A turn-on order or a turn-off order is determined in each of the element groups 841 to 843 by executing the processes of Steps S 23 to S25 in FIG. 7 and a threshold value of each of elements 821 to 823 in the matrix area 80 is determined in accordance with the turn-on order(s) and/or the turn-off order (s) for the first to third element groups 841 to 843. In the present preferred embodiment, a turn-on order is determined in each of the first and second element groups 841, 842 and a turn-off order is determined in the third element group 843.

Figure 17:
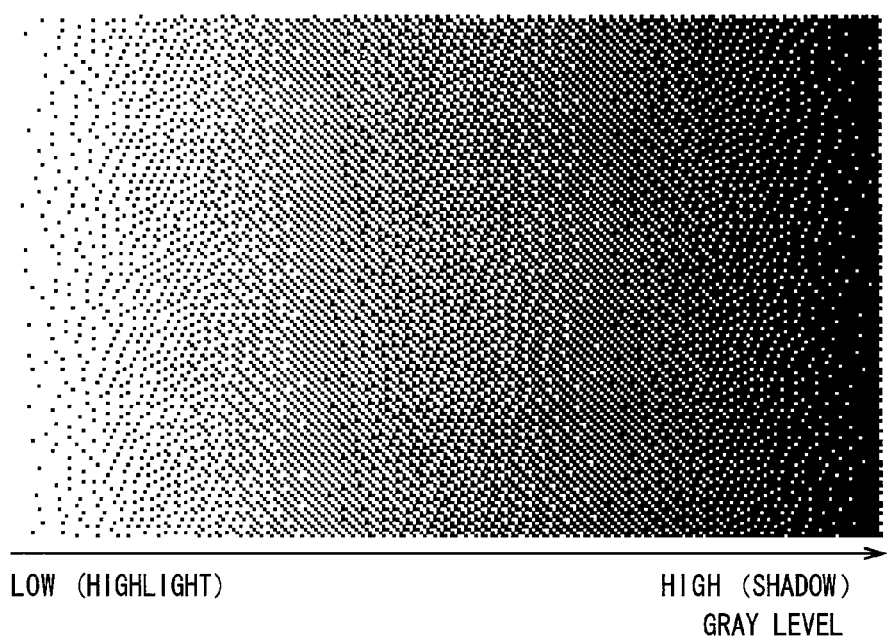
FIG. 17 is a view showing a halftone image.

A halftone image of FIG. 17 is generated by halftoning an image whose gray levels (values of pixels) are constant in the column direction and linearly changing from 0 to 255 in the row direction (the image is a so-called gradation image), with using a threshold matrix 81 derived from the matrix area 80 shown in FIG. 16. The halftone image of FIG. 17 has directionality in a direction corresponding to the tilt direction in the matrix area 80, and the directionality in the middle grayscale range is outstanding in comparison with the halftone image shown in FIG. 10.

Four element groups which respectively correspond to four grayscale ranges may be set in a matrix area 80, the four grayscale ranges being acquired by dividing the whole grayscale range in the original image 70. As discussed above, in generation of a threshold matrix 81, a plurality of linear areas, which are arranged in the arrangement direction perpendicular to the tilt direction without spaces in a matrix area 80, are sequentially assigned to a plurality of element groups along the arrangement direction, the plurality of element groups corresponding to a plurality of grayscale ranges acquired by dividing the whole grayscale range. Thus, the plurality of element groups each of which defines existence areas of halftone dots which are added or removed in accordance with increase or decrease in gray level in a grayscale range corresponding to each of the plurality of element groups, are set in the matrix area 80, and it is therefore possible to cause directionality in a direction corresponding to the tilt direction in a halftone image.

In the matrix areas 80 shown in FIGS. 9, 13, 14 and 16, in each element column 82b, an element included in an element group or elements successive in the column direction which are included in an element group, is arranged at an interval which is as large as or larger than three times the element pitch and the same is applied to each element row 82a, however, in one of the element column 82b and the element row 82a, an element 821 or 822 included in one element group 841 or 842 may be arranged at an interval twice as long as the element pitch (that is, one element 821 and one element 822 may be alternately arranged).

Figure 18:
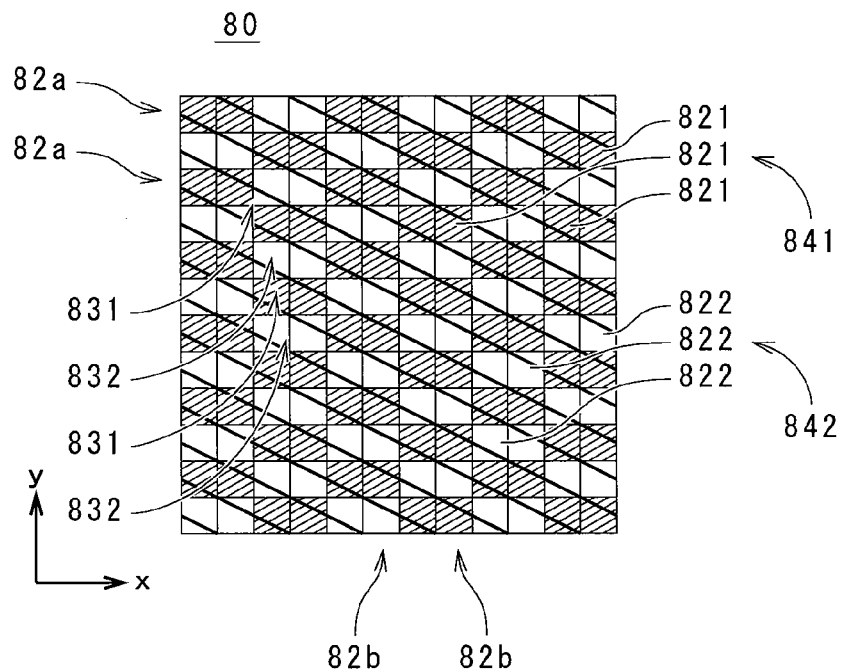
FIG. 18 is a view showing still another example of the first and second element groups.

For example, as shown in FIG. 18, there may be a case where linear areas 831, 832 which have the same width and are tilted by almost 63 degrees relatively to the column direction are set in a matrix area 80 so that in each element row 82a, successive two elements 821 included in a first element group 841 (the elements are hatched ones in FIG. 18 and elements included in a first element group are indicated by hatching also in FIGS. 19, 21, and 23 discussed later) and successive two elements 822 included in a second element group 842 (the elements are non-hatched blank ones in FIG. 18 and elements included in a second element group are not provided with parallel lines also in FIGS. 19, 21, and 23 discussed later) are arranged at an interval four times the element pitch and in each element column 82b, one element 821 included in the first element group 841 and one element 822 included in the second element group 842 are arranged at an interval twice the element pitch. When a halftone image is generated with use of a threshold matrix 81 derived from the matrix area 80 shown in FIG. 18, there is a possibility the halftone image has directionality in the column direction, however, directionality in a direction corresponding to the tilt direction are normally stronger than that in the column direction and it is therefore possible to suppress occurrence of the longitudinal streak and graininess in the halftone image. In order to surely suppress occurrence of directionality in the row and column directions in the halftone image, it is preferable that in each of the element column 82b and the element row 82a, an element included in an element group or successive elements included in an element group is arranged at an interval which is as large as or larger than three times the element pitch.

Figure 19:
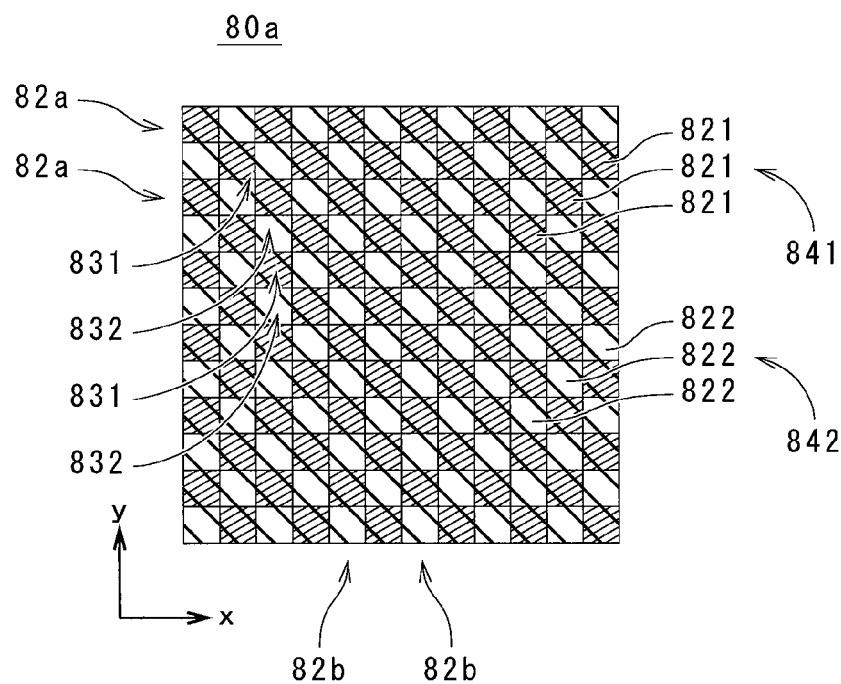
FIG. 19 is a view showing first and second element groups in accordance with an example for comparison.

As shown in FIG. 19, in the case that linear areas 831, 832 are tilted by 45 degrees relatively to the row and column directions and each width of the linear area 831, 832 is made a half of the diagonal line of the element, in each of the element row 82a and the element column 82b, one element 821 included in a first element group 841 and one element 822 included in a second element group 842 are arranged at an interval twice the element pitch, and the arrangement of the elements 821 in the first element group 841 and the elements 822 in the second element group 842 becomes a checkered pattern (a checkered flag pattern). In this case, when a halftone image is generated with use of a threshold matrix derived from the matrix area 80a shown in FIG. 19, since the density of clusters in the halftone image becomes so high that directionality in a direction corresponding to the tilt direction weakens (or directionality in the row and column directions arises and it dilutes directionality in a direction corresponding to the tilt direction), there is a possibility the longitudinal streak and graininess occurs in a printed image. Therefore, an arrangement where elements 821, 822 in first and second element groups 841, 842 are arranged in the checkered pattern is excluded in the element group setting part 51.

Though, in the above operation example described referring to FIG. 7, the threshold matrix of another color component is derived from the threshold matrix 81 of one color component which is generated through the processes of Steps S21 to S27, there may be a case where, in a matrix area of another color component with a different size (i.e., the number of elements in the x direction and/or the number of elements in the y direction) from the matrix area 80 of one color component, the same processes as those of Steps S21 to S27 are performed to generate the threshold matrix of another color component which has the different size from the threshold matrix 81 of one color component. Also, there may be a case where, in matrix areas of the plurality of color components (the matrix areas may be the same size), intervals in the arrangement direction of linear areas in element groups corresponding to one another (actually, the intervals depend on widths in the arrangement direction of the linear areas), phases which represent positions in the row direction of elements belonging to the element groups in element rows corresponding to one another, or tilt directions of the linear areas (the directionality) are changed, to generate threshold matrixes of the plurality of color components having different patterns of element groups in the matrix areas (i.e., arrangements of elements belonging to respective element groups differ in the threshold matrixes.). In the above any case, since arrangements of threshold values in the threshold matrixes are different from one another in the plurality of color components, it is possible to suppress occurrence of moire and color irregularity in a printed color image, caused by interference of halftone images of the plurality of color components.

Next discussion will be made on a technique for generating a threshold matrix suitable for a mechanism (mechanisms) in accordance with printing in the printer 1. In the present operation example, a is the number of elements in the row direction (x direction) of a matrix area 80 corresponding to the width direction where the outlets 231 are arranged in the head 21. In the operation part 5, first, the process of Step S21 in FIG. 7 is performed to set a plurality of element groups 841, 842 in the matrix area 80.

After a first element group 841 corresponding to a grayscale range including a gray level at the end on the highlight side is specified as the target element group in the process of Step S22 in FIG. 7, a dot is set at arbitrary one element 821 in the target element group 841 in the process of Step S23. In the first process of Step S24, a plurality of elements 821 which exist at the same position in the x direction as the element 821 where a dot has already set (i.e., the plurality of elements 821 included in the same element column 82*b*), are excluded from objects to be added to with dots and a new dot is added to an element 821 which is farthest from existing dots, on the premise of spatial repetition of the threshold matrix 81.

In the second process of Step S24, a plurality of elements 821 included in the same element column 82*b* as that including each of the element 821 selected in the process of Step S23 and the element 821 selected in the first process of Step S24, are excluded from the objects to be added to with dots and a new dot is added to an element 821 which is farthest from existing dots (on the premise of spatial repetition of the threshold matrix 81). Further, in the third process of Step S24, a plurality of elements 821 included in the same element column 82*b* as that including each of the element 821 selected in the process of Step S23, the element 821 selected in the first process of Step S24 and the element 821 selected in the second process, are excluded from the objects to be added to with dots and a new dot is added to an element 821 which is farthest from existing dots. In this manner, a new dot is added to an element 821 which is farthest from existing dots while excluding elements 821 included in the same element columns 82*b* as those respectively including existing dots in the target element group 841, from objects to be added to with dots. Therefore, when the (α−1)th process of Step S24 is finished, each element column 82*b* includes one element 821 where a dot is set. Such a condition is removed from the αth process of Step S24, and a new dot is added to an element 821 which is farthest from existing dots.

In a general inkjet printer, if a time period where ink is not ejected from each outlet (i.e., a time period from when ejection of ink is performed to when the next ejection of ink is performed) in printing (i.e., in a state where a head is away from a home position) becomes long, there is a case where ink in the vicinities of outlets hardens to block the outlets. Especially, in a case where many pixels having gray levels on a highlight side exist in an original image, the time period where ink is not ejected tends to become longer.

On the other hand, in the above threshold matrix generating process, a condition for assigning one of numbers 1 to α in the turn-on order to one element 821 in each element column 82*b* in the target element group 841 corresponding to the grayscale range including the gray level at the end on the highlight side is provided, and the process of Step S24 is repeated in accordance with the condition, to thereby determine the turn-on order in gray levels in the grayscale range corresponding to the target element group 841. As a result, in the printer 1 for printing an image on the printing paper 9 by ejecting droplets of ink from the plurality of outlets 231, it is possible to reduce a possibility where ink is not ejected from each outlet 231 for a long time in the actual printing and to suppress blockage of the outlets 231 by hardening of the ink in the vicinities of the outlets 231 in printing. The condition set in the process of Step S24 may be another condition. The present technique may be used in a threshold matrix generating process according to the second preferred embodiment which is discussed later.

In a case where resolutions in the scan direction and the width direction in the printer 1 (i.e., the number of dots per unit length on the printing paper 9) are different from each other (such as a case where a resolution in the scan direction is 720 dpi (dot per inch) and a resolution in the width direction is 360 dpi), the evaluation function used in the process of Step S24 of FIG. 7 may be that in consideration of the difference of the resolutions. Specifically, when a resolution in the width direction corresponding to the x direction is ResX and a resolution in the scan direction corresponding to the y direction is ResY, an evaluation value Ed. (xd, yd) of each element 821 in the coordinates (xd, yd) of the matrix area 80 in obtaining an element 821 to which the dot is set in the nth setting (the nth new dot is set) in the process of Step S24 of FIG. 7, is obtained by Eq. 2 where r is a number of the central matrix area 80 and the matrix areas 80 assumed in the 8-neighborhoods of the central matrix area 80 (see FIG. 9) and $xd_{mr}$ and $yd_{mr}$ are respectively positions in the x direction and the y direction of the mth dot in the rth matrix area 80.

$$Ed_n(xd, yd) = \sum_{m=0}^{n-1} \sum_{r=0}^{8} \frac{1}{(xd - xd_{mr})^2 / F + (yd - yd_{mr})^2 * F} \quad \text{Eq. 2}$$

where $F = ResX / ResY$

In Eq. 2, when the resolution in the Y direction is lower than that in the X direction, the effect on an evaluation value of a distance in the y direction between each element 821 and an existing dot is greater than that of a distance in the x direction between the element 821 and the existing dot, and the greater the distances in the y direction between each element 821 and existing dots, a number (ordinal number) in the turn-on order of the element 821 tends to become smaller. When the resolution in the X direction is lower than that in the Y direction, the effect on an evaluation value of a distance in the x direction between each element 821 and an existing dot is greater than that of a distance in the y direction, and the greater the distances in the x direction between each element 821 and existing dots, a number in the turn-on order of the element 821 tends to become smaller. The same evaluation function is used in obtaining an element 822 whose dot is removed in the nth removing in determining the turn-off order.

As discussed, when an element farthest from specified elements is specified in the process of Step S24 of FIG. 7 (i.e., an element which is farthest from existing dots or an element which is farthest from elements where dots are not set is specified), a weighting coefficient for a distance in the row direction and a weighting coefficient for a distance in the column direction are made to be different from each other in accordance with the resolutions in the main scan direction and the sub scan direction, and it is therefore possible to suppress extension of an arrangement of dots in a direction where a resolution is low in an image printed in the printer 1 and to print a preferable printed image. The present technique may be used in a threshold matrix generating process according to the second preferred embodiment which is discussed later.

In a case where a size of a dot which is actually formed on the printing paper 9 is larger relatively to the resolutions in the scan direction and the width direction in the printer 1, an element which is assigned a threshold value representing absence of a dot (i.e., a dot is not written) may be provided in the threshold matrix 81 (the element represents sleep of ejection of ink from the outlet 231 and hereinafter referred to as a "sleep element"). For example, in the printer 1 where both resolutions in the scan direction and the width direction are 720 dpi, a dot formed on the printing paper 9 is arranged at a pitch of 35 micrometer (μm) in both the scan and width directions, however in this case, if dots each having a diameter of 70 μm are formed on the printing paper 9, characters tend to be deformed in printing small characters or the like. In such a case, a plurality of elements with larger numbers in the final turn-on order, that is, a plurality of elements with larger numbers in the turn-on order in an element group corresponding to a grayscale range including a gray level at the end on the shadow side, or a plurality of elements with smaller numbers in the turn-off order in the element group, are treated as sleep elements and a value representing the maximum gray level (i.e., 255) in the whole grayscale range of the original image is assigned to each of the sleep elements as an element value (threshold value).

As discussed earlier, in generation of the halftone image, only when a pixel value of a pixel in the original image is larger than the threshold value of the element in the threshold matrix 81 corresponding to the pixel value, a value representing ON of ejection of ink is assigned to the position in the halftone image corresponding to the pixel. Therefore, the value representing the maximum gray level of the original image is assigned to each of the sleep elements in the threshold matrix 81 and thereby, a pixel value representing OFF of ejection of ink is certainly assigned to each of pixels in the halftone image corresponding to the sleep elements. With this operation, it is possible to suppress occurrence of deformation of characters or the like in the halftone image.

Actually, threshold matrixes where the number of sleep elements is changed in a plurality of manners are prepared, a halftone image which is generated by halftoning an original image including characters with using each threshold matrix is printed on a printing paper 9 as a trial, a preferable threshold matrix is determined on the basis of evaluations of deformation of characters and reproduction of the original image in the printed image, and then the threshold matrix is used as a final threshold matrix 81 used in actual printing. That is to say, the number of elements which are made to sleep elements in the threshold matrix 81 are determined by test printing. The present technique for providing the sleep elements in the threshold matrix 81 may be used in a threshold matrix generating process according to the second preferred embodiment which is discussed later.

Next discussion will be made on a threshold matrix generating process in accordance with the second preferred embodiment of the present invention with reference to FIG. 7. First, in the element group setting part 51 of FIG. 4, a plurality of stripe pattern areas which are tilted relatively to the row direction and the column direction and cross one another, are set in a matrix area which is an area where a threshold matrix is generated and a plurality of elements are arranged in the row direction and the column direction.

Figure 20:
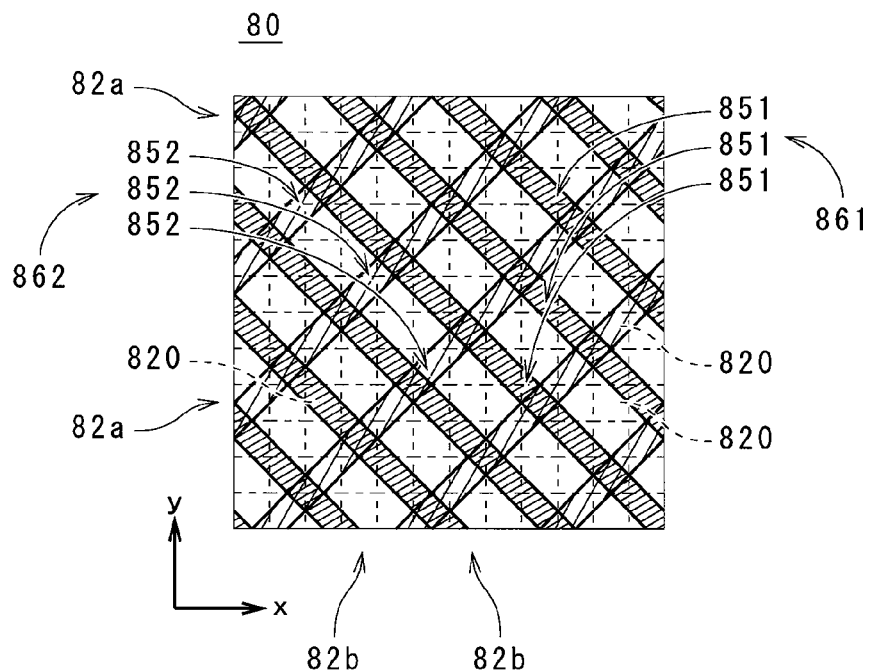
FIG. 20 is a view showing stripe pattern areas in a matrix area in accordance with the second preferred embodiment.

FIG. 20 is a view showing a part of a matrix area 80. In the present preferred embodiment, a direction which is acquired by rotating the y axis counterclockwise by 45 degrees around an axis perpendicular to the xy plane and a direction which is acquired by rotating the y axis clockwise by 45 degrees around the axis are defined as a first tilt direction and a second tilt direction, respectively, and a first stripe pattern area 861 which is a group of a plurality of linear areas 851 (shown by parallel diagonal lines where the distance between lines is smaller in FIG. 20) each of which extends in the first tilt direction and a second stripe pattern area 862 which is a group of a plurality of linear areas 852 (shown by parallel diagonal lines where the distance between lines is larger in FIG. 20) each of which extends in the second tilt direction are set in the matrix area 80.

The plurality of linear areas 851 included in the first stripe pattern area 861 are arranged in an arrangement direction perpendicular to the first tilt direction with regular spaces and respective widths in the arrangement direction of the plurality of linear areas 851 are equal. The plurality of linear areas 852 included in the second stripe pattern area 862 are arranged in an arrangement direction perpendicular to the second tilt direction with regular spaces and respective widths in the arrangement direction of the plurality of linear areas 852 are equal. In the example of FIG. 20, the width of the linear area 851 in the first stripe pattern area 861 is made to be equal to the width of the linear area 852 in the second stripe pattern area 862. The pitch of the linear areas 851 in a direction perpendicular to the first tilt direction is made longer than the width of the linear area 851 and is made shorter than the pitch of the linear areas 852 in a direction perpendicular to the second tilt direction. Each linear area 851, 852 includes the center of one of elements 820 included in each element row 82*a* (or each element column 82*b*) through which the linear area 851, 852 passes. A group of elements 820 whose centers are included in the first stripe pattern area 861 and the second stripe pattern area 862 is treated as a first element group and a group of elements 820 included in the remaining areas (i.e., a group of the remaining elements 820) is treated as a second element group.

Figure 21:
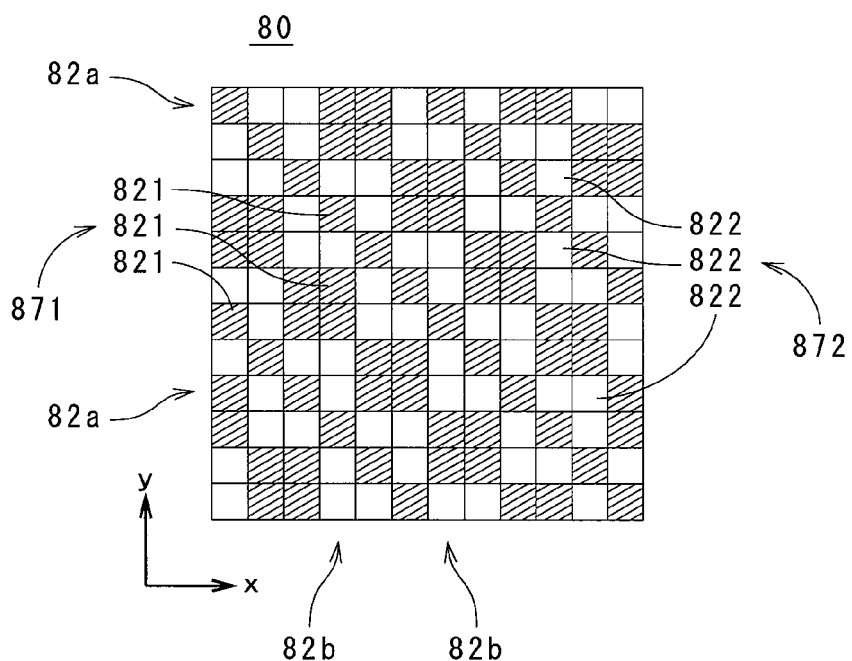
FIG. 21 is a view showing first and second element groups.

FIG. 21 is a view showing a first element group 871 and a second element group 872. In FIG. 21, the reference number 821 is assigned to each of elements included in the first element group 871 (hatched elements in FIG. 21) and the reference number 822 is assigned to each of elements included in the second element group 872 (non-hatched blank elements in FIG. 21). In a matrix area 80 of FIG. 21, in each element row 82*a*, ½ of elements included in the element row 82a is elements 821 of the first element group 871 and the remaining ½ of the elements is elements 822 of the second element group 872 (the same as in each element column 82b). Thus, the first element group 871 corresponds to a grayscale range of 0 to 50% which is ½ of the whole grayscale range and the second element group 872 corresponds to a grayscale range of 50 to 100% which is the other ½ of the whole grayscale range.

As described above, a plurality of stripe pattern areas 861, 862 which are tilted relatively to the row and column directions and cross one another, are set in the matrix area 80, and the plurality of stripe pattern areas 861, 862 are assigned to one of the two element groups 871, 872 and the remaining areas are assigned to the other of the two element groups 871, 872, to thereby set the first element group 871 and the second element 872 in the matrix area 80 (Step S21).

Similarly to the first preferred embodiment, arbitrary one element is specified in each of the element groups 871, 872 to change the element to a specified element and subsequently the process of changing another element in the element group to a specified element, which is the element farthest from specified elements in the element group, on the premise of spatial repetition of the threshold matrix 81 in halftoning of the original image 70, is repeated in the order determining part 52, to determine a turn-on order in which halftone dots are added to elements in each of the element groups 871, 872 in accordance with increase in gray level in the grayscale range corresponding to the element group or a turn-off order in which halftone dots are removed from elements in the element group in accordance with decrease in gray level in the grayscale range corresponding to the element group (Steps S22 to S26). In the present preferred embodiment, the turn-on order is determined for the first element group 871 and the turn-off order is determined for the second element group 872. In the threshold value determining part 53, a threshold value of each element in the matrix area 80 is determined in accordance with the turn-on order(s) and/or the turn-off order (s) for the two element groups 871, 872, to complete a threshold matrix 81 (Step S27).

As discussed above, in the printer 1, the plurality of stripe pattern areas 861, 862 which are tilted relatively to the row and column directions and cross one another, are set in the matrix area 80, and a group of elements 821 included in the plurality of stripe pattern areas 861, 862 is treated as the first element group 871 and a group of the remaining elements 822 is treated as the second element group 872. Arbitrary one element is specified in each of the element groups 871, 872 and subsequently the process of specifying another element in the element group, which is the element farthest from specified elements in the element group, is repeated to acquired the turn-on order or the turn-off order in each of the element groups 871, 872 and then a threshold value of each element in the matrix area 80 is determined in accordance with the turn-on order(s) and/or the turn-off order(s). Thus, it is possible to generate the threshold matrix 81 which is capable of reducing graininess in a halftone image with directionality in directions (the first and second tilt directions) tilted relatively to the row and column directions, and further improving the reproduction of thin lines, characters, and the like. Also, it is possible to suppress occurrence of the longitudinal streak (see FIG. 11A) extending in the scan direction in a printed image in a case that the accuracy of dot recording position in the width direction is low in the printer 1, and further to suppress appearance of graininess (see FIG. 11B) in a printed image in a case that the accuracy of dot recording position in the scan direction is low in the printer 1.

A plurality of stripe pattern areas can be set in various manners in a matrix area 80. For example, the widths and the tilt angles of the linear areas 851, 852 in the first stripe pattern area 861 and the second stripe pattern area 862 may be different from each other and three or more stripe pattern areas may be set in a matrix area 80 in an aspect which ensures directionality in directions tilted relatively to the row and column directions in a halftone image.

Figure 22:
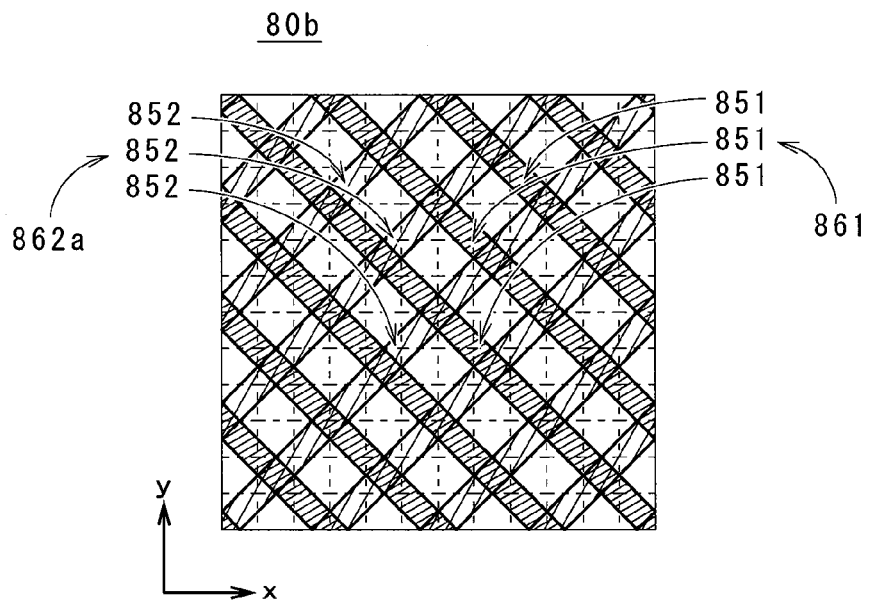
FIG. 22 is a view showing stripe pattern areas in a matrix area in accordance with an example for comparison.
Figure 23:
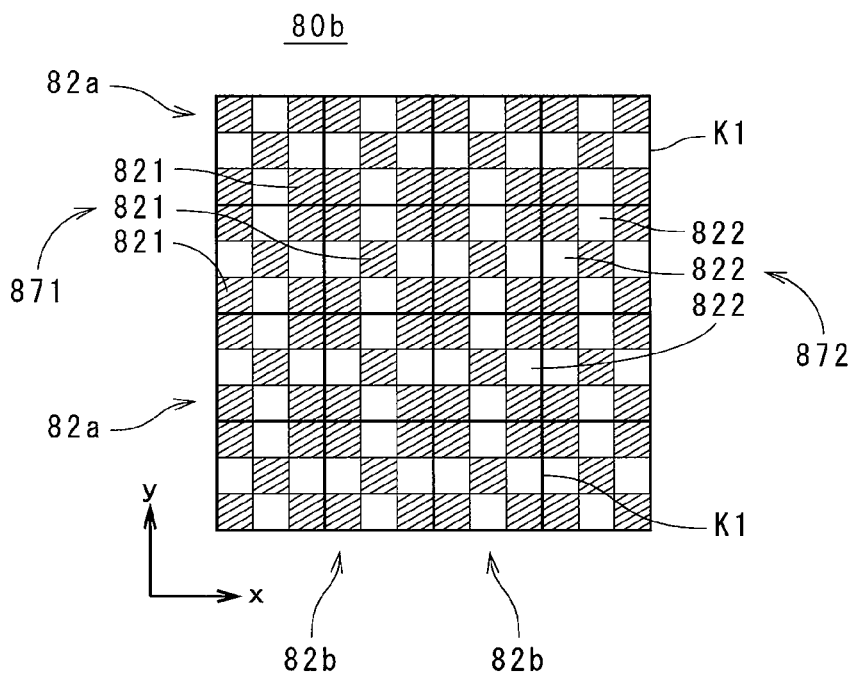
FIG. 23 is a view showing first and second element groups in accordance with an example for comparison.

As shown in FIG. 22, if a stripe pattern area where the first stripe pattern area 861 shown in FIG. 20 is reversed in the x direction (i.e., the stripe pattern area which is reversed with reference to a straight line which is parallel to the y direction and passes through the center in the x direction) is used as a second stripe pattern area 862a (i.e., a group of linear areas 852 shown by parallel diagonal lines where the distance between lines is larger in FIG. 22), and the second stripe pattern area 862a is set in a matrix area 80b in addition to a first stripe pattern area 861 (shown by parallel diagonal lines where the distance between lines is smaller), an arrangement of elements 821, 822 in first and second element groups 871, 872 is the same one where the arrangement of elements 821, 822 in three rows and three columns (indicated by a thick-line rectangle K1 in FIG. 23) out of the checkered pattern in FIG. 19, is tiled (i.e., the arrangement is repeatedly arranged in the x direction and the y direction without spaces) as shown in FIG. 23. When a halftone image is generated with use of a threshold matrix derived from the matrix area 80b shown in FIG. 23, since directionality in the row and column directions arises in the halftone image and it dilutes directionality in directions corresponding to the tilt directions, there is a possibility the longitudinal streak or graininess occurs in a printed image.

The arrangement of elements 821, 822 in the checkered pattern shown in FIG. 19 is also formed by setting one stripe pattern area which is a group of the plurality of linear areas 831 in FIG. 19 and another stripe pattern area which is acquired by reversing the stripe pattern area in the x direction and moving the reversed stripe pattern area by one element in the y direction, in a matrix area 80 (each stripe pattern area includes only elements included in the linear areas 831). Also in this case, directionality in directions corresponding to the tilt directions are weakened in a halftone image as described earlier. Therefore, an arrangement of elements 821, 822 in the element groups 871, 872, the arrangement being the checkered pattern or a pattern acquired by tiling a part of the checkered pattern, is excluded in the element group setting part 51 for setting a plurality of stripe pattern areas.

In generating process of the threshold matrix 81 according to the present preferred embodiment, similarly to the first preferred embodiment, the threshold matrix of another color component may be derived from the threshold matrix 81 of one color component which is generated through the processes of Steps S21 to S27, and also in a matrix area of another color component with a different size from the matrix area 80 of one color component, the same processes as those of Steps S21 to S27 may be performed to generate the threshold matrix of another color component which has the different size from the threshold matrix 81 of one color component. Further, there may be a case where intervals in the arrangement direction of linear areas in stripe pattern areas corresponding to one another, phases which represent positions in the row direction of elements belonging to the stripe pattern areas in element rows corresponding to one another, or tilt directions of the linear areas (the directionality) are changed in matrix areas of the plurality of color components (the matrix areas may be the same size), to generate threshold matrixes of the plurality of color components where patterns of element groups in the matrix areas are different from one another. In the above any case, since arrangements of threshold values in the threshold matrixes are different in respective color components, it is possible to suppress occurrence of moire and color irregularity in a printed image, caused by interference of halftone images of the plurality of color components.

Next discussion will be made on another operation example of the printer 1. Each outlet of a head 21 in the printer 1 according to the present operation example can form a plurality of dots having different sizes on a printing paper 9 by ejecting different amounts of droplets, and a dot of S size which is the smallest one, a dot of M size which is larger than S size, and a dot of L size which is larger than M size can be formed in the present operation example.

Each threshold value of a threshold matrix used in the actual printing in the printer 1 according to the present operation example is a set of a sub-threshold value used for determining necessity of formation of a dot with S size, a sub-threshold value used for determining necessity of formation of a dot with M size, and a sub-threshold value used for determining necessity of formation of a dot with L size. The threshold matrix is divided into a sub-threshold matrix which is a two-dimensional array of the sub-threshold values for S size, a sub-threshold matrix which is a two-dimensional array of the sub-threshold values for M size, and a sub-threshold matrix which is a two-dimensional array of the sub-threshold values for L size, and these sub-threshold matrixes are stored in the matrix memory 42 of FIG. 4. Out of the mutually corresponding sub-threshold values in the sub-threshold matrixes, the smallest value is in the sub-threshold matrix for S size and the largest value is in the sub-threshold matrix for L size (if the above sleep elements are provided, the same sub-threshold value is assigned to each of the sleep elements). The sub-threshold matrix will be described later.

In generation of a halftone image for each color component in the printer 1, first, a pixel value of each pixel in the original image is compared with a sub-threshold value of the sub-threshold matrix for S size corresponding to the pixel value. Comparison of the pixels in the original image is actually performed one by one, however conceptually, in the original image, pixels at the positions where the pixel values are larger than the corresponding sub-threshold values of the sub-threshold matrix for S size, for example, are assigned the pixel values "1" and the remaining pixels are assigned the pixel values "0", to generate a provisional outputted image. Subsequently, the pixel value of each pixel in the original image is compared with the corresponding sub-threshold value of the sub-threshold matrix for M size, and pixels in the outputted image at the positions where the pixel values are larger than the corresponding sub-threshold values of the sub-threshold matrix are changed to the pixel values "2" and the remaining pixels keep the pixel values as is, to modify the provisional outputted image. Then, the pixel value of each pixel in the original image is compared with the corresponding sub-threshold value of the sub-threshold matrix for L size, and pixels in the outputted image at the positions where the pixel values are larger than the corresponding sub-threshold values of the sub-threshold matrix are changed to the pixel values "3" and the remaining pixels keep the pixel values as is, to acquire a quaternary outputted image, which is comparison results between the pixel values of the original image and the corresponding threshold values of the threshold matrix, as a halftone image. As discussed later, since the pixel values "1", "2" and "3" in the halftone image indicate the size of dot which is formed on the printing paper 9 by the corresponding outlet, the halftone image is substantially a halftone image represented by the absence or presence of dot (and size of dot).

As discussed earlier, out of the corresponding sub-threshold values in the elements (other than the sleep elements) of the threshold matrix, the smallest one is in the sub-threshold matrix for S size and the largest one is in the sub-threshold matrix for L size. Thus, in comparison between the original image and the sub-threshold matrix for S size, when a pixel value of a pixel in the original image is equal to or smaller than the corresponding sub-threshold value of the sub-threshold matrix, the pixel value is always equal to or smaller than the corresponding sub-threshold values of the sub-threshold matrix for M size and the sub-threshold matrix for L size. When a pixel value of a pixel in the original image is equal to or smaller than the corresponding sub-threshold value of the sub-threshold matrix for M size, the pixel value is always equal to or smaller than the corresponding sub-threshold value of the sub-threshold matrix for L size. Comparing such pixel values of pixels in the original image with the corresponding sub-threshold values of the sub-threshold matrixes for M and L sizes may be omitted.

In the printer 1, with respect to each color component, the process of printing generated parts of the halftone images is performed while generating the halftone image as discussed above. In printing the halftone image, in synchronization with relative movement of the head 21 to the printing paper 9, in the ejection controller 44, when a pixel value in the halftone image corresponding to an ejection position of each outlet on the printing paper 9 is "1", a dot of S size is formed on the ejection position, and when the pixel value in the halftone image is "2", a dot of M size is formed on the ejection position. Also, when the pixel value in the halftone image is "3", a dot of L size is formed on the ejection position, and when the pixel value in the halftone image is "0", a dot is not formed on the ejection position. In this way, in synchronization with the relative movement of the head 21 to the printing paper 9 (scanning of the plurality of ejection positions on the printing paper 9 associated with the plurality of outlets, respectively), ejection of ink from the plurality of outlets is controlled in accordance with comparison results between the pixel values of the original image at the ejection positions of the plurality of outlets relative to the printing paper 9 and the threshold values of the threshold matrix corresponding to the pixel values, to print a halftone image on the printing paper 9.

Next discussion will be made on a technique of generating the sub-threshold matrixes for one color component. The sub-threshold matrixes for the other color components are generated in the same manner.

In the threshold value determining part 53, after the threshold matrix 81 is generated by performing the processes of Steps S21 to S27 of FIG. 7 according to the first or second preferred embodiment, a matrix where a quotient obtained by dividing a threshold value of each element (other than the sleep elements) by 2 is used as a new value (i.e., sub-threshold value) of the element is generated as a sub-threshold matrix for formation of dot with S size. In the sub-threshold matrix for formation of dot with S size, a value of each element is one of 0 to 127. The value 64 which is 25% of 256 gray levels in the original image is added to the value of each element of the sub-threshold matrix for formation of dot with S size to generate a sub-threshold matrix for formation of dot with M size, and the value 128 which is 50% of 256 gray levels in the original image is added to the value of each element of the sub-threshold matrix for formation of dot with S size to generate a sub-threshold matrix for formation of dot with L size. A value of each element in the sub-threshold matrix for formation of dot with M size is one of 64 to 191 and a value of each element in the sub-threshold matrix for formation of dot with L size is one of 128 to 255. In this way, a threshold value of each element in the threshold matrix 81 is converted to thereby generate a plurality of sub-threshold values which are respectively included in the sub-threshold matrix for formation of dot with S size, the sub-threshold matrix for formation of dot with M size, and the sub-threshold matrix for formation of dot with L size.

Figure 24:
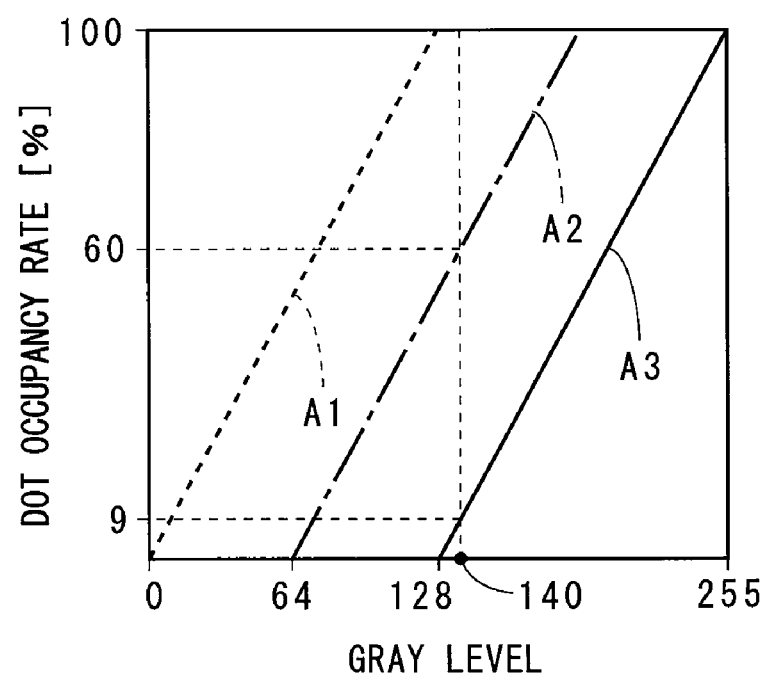
FIG. 24 is a graph for explaining characteristics of sub-threshold matrixes.

Here, discussion will be made on the characteristics of the sub-threshold matrixes. FIG. 24 is a graph for explaining the characteristics of the sub-threshold matrixes. In FIG. 24, the vertical axis shows a proportion of the number of dots with each size formed on the printing paper 9 relative to the number of all pixels, in a case where an image with a uniform gray level is printed with use of only the sub-threshold matrix for that size in the printer 1 (hereinafter, the proportion is referred to as "dot occupancy rate"), and the horizontal axis shows a gray level of the image in this case. In FIG. 24, a broken line A1 is a dot occupancy rate in the case of only using the sub-threshold matrix for S size, a one-dot chain line A2 is that in the case of only using the sub-threshold matrix for M size, and a solid line A3 is that in the case of only using the sub-threshold matrix for L size. In this case, the threshold matrix 81 does not include the sleep elements.

As shown in FIG. 24, in the case of only the sub-threshold matrix for S size, the dot occupancy rate linearly increases from 0 to 100% as the gray level of the image increases from 0 to 128, and the dot occupancy rate keeps 100% at a gray level of 128 or more. In the case of only the sub-threshold matrix for M size, the dot occupancy rate is 0% at a gray level of the image which is equal to or smaller than 64, it linearly increases from 0 to 100% as the gray level increases from 64 to 192, and it keeps 100% at a gray level of 192 or more. In the case of only the sub-threshold matrix for L size, the dot occupancy rate is 0% at a gray level of the image which is equal to or smaller than 128, and it linearly increases from 0 to approximately 100% as the gray level increases from 128 to 255.

For example, looking at a gray level of 140, the dot occupancy rate in the sub-threshold matrix for L size is 9%, that in the sub-threshold matrix for M size is 60%, and that in the sub-threshold matrix for S size is 100%, as shown in FIG. 24. As discussed above, the dots with the different sizes are not formed on the same position in the actual printing and the dot with larger size is formed on a preferential basis. In the sub-threshold matrixes for S, M, and L sizes, out of the values (the sub-threshold values) in the same position, the largest one is in the sub-threshold matrix for L size and the smallest one is in the sub-threshold matrix for S size. Under the above-discussed assumption that the image with the uniform gray level is printed with use of only the sub-threshold matrix for each size (i.e., an image formed only by dots with S size, an image formed only by dots with M size, and an image formed only by dots with L size are printed), in a gray level, a dot is certainly formed in the same position in each of the image formed only by dots with S size and the image formed only by dots with M size, as a position of dot in the image formed only by dots with L size, and a dot is certainly formed in the same position in the image formed only by dots with S size, as a position of dot in the image formed only by dots with M size.

Therefore, if an image with a uniform gray level of 140 is printed with use of a set of the sub-threshold matrixes in the printer 1, the dot occupancy rate of L size is 9%, that of M size is 51% (which is calculated by (60-9)), and that of S size is 40% (which is calculated by (100-60)). Since the original image actually has a tone (i.e., portions of various gray levels) and each pixel value is compared with the sub-threshold values in the corresponding position of the sub-threshold matrixes, dots with S, M, and L size are stochastically formed in printing in accordance with the graph of FIG. 24 by using the threshold matrix where each threshold value is a set of the sub-threshold values. In a case where the threshold matrix 81 includes the sleep elements, since a dot with any size is not formed in each of positions corresponding to the sleep elements, the maximum value of the dot occupancy rates becomes a value smaller than 100%.

As discussed above, in generating process of the threshold matrix according to the present operation example, the plurality of sub-threshold values used for determination of size of a dot are generated from the threshold value of each element in the threshold matrix 81 where the threshold values are assigned by the processes of Steps S21 to S27 of FIG. 7. It is therefore possible to suppress occurrence of the longitudinal streak and graininess in the image printed in the printer 1 which is capable of forming dots having different sizes, and further to improve the reproduction of thin lines, characters and the like in the image.

Though the preferred embodiments of the present invention have been discussed above, the present invention is not limited to the above-discussed preferred embodiments, but allows various variations.

The threshold matrix 81 generated in the first and second preferred embodiments is particularly suitable for generation of halftone image data used in an inkjet printer which has a head having a plurality of outlets used for recording dots to a plurality of ejection positions, respectively, arranged in a width direction on a printing paper and a scanning mechanism for moving the plurality of ejection positions on the printing paper relatively to the printing paper in a scan direction perpendicular to the width direction. The threshold matrix 81 can be applied to the other image recording apparatuses in connection with making a printed material, such as an electrophotographic printer or a plate-making apparatus for CTP (Computer To Plate).

For example, the electrophotographic printer is provided with a head having a plurality of light emitting elements (e.g., semiconductor lasers or light emitting diodes (LED)) and a photosensitive drum where a photosensitive material is formed on its outer surface. A plurality of light irradiation positions on the photosensitive material, which are respectively irradiated with a plurality of light beams outputted from the head, move in a direction (scan direction) along a rotation axis of the photosensitive drum by a polygon mirror which is rotated in the head, and an image of a plurality of lines is recorded on the photosensitive material with one scan of the plurality of light irradiation positions. The plurality of light irradiation positions move (sub-scan) relatively to the photosensitive material in a width direction corresponding to a circumferential direction of the photosensitive drum by rotation of the photosensitive drum. In the printer, an electrostatic latent image is formed (i.e., a halftone image is recorded) on the photosensitive material, the electrostatic latent image is developed by toner, and then a toner image is transferred onto a printing paper (naturally, toner images of a plurality of color components may be formed). As discussed above, the photosensitive material of the photosensitive drum is used as an object where dots (elements of the electrostatic latent image) are recorded by irradiation with light from the head, and the halftone image is printed on the printing paper by using the photosensitive material where the electrostatic latent image, which is a group of dots, is recorded.

In the electrophotographic printer, even in a case where the intervals in the width direction of adjacent light irradiation positions in the plurality of light irradiation positions on the photosensitive material are different from one another or the like, printing is performed with use of halftone image data generated by comparing the original image 70 with the threshold matrix 81, to thereby suppress occurrence of graininess and the longitudinal streak extending in a direction corresponding to the scan direction in a printed image and further to improve the reproduction of thin lines, characters and the like in the printed image.

The plate-making apparatus is provided with a head having a light source and a spatial light modulator and a drum which is wound with a printing plate. A plurality of light irradiation positions on the printing plate, which are respectively irradiated with a plurality of light beams outputted from the head, are arranged in a width direction along a rotation axis of the drum. The plurality of light irradiation positions move in a circumferential direction (scan direction) of the drum relatively to the printing plate by rotation of the drum, to record a halftone image, which is a group of dots, on the printing plate, and to make a printing plate used for printing (naturally, printing plates of the other color components may be made). As described above, the plate-making apparatus is an image recording apparatus for recording an image on an object, where the printing plate on which the halftone image is recorded is used as the object. Printing is performed in another apparatus by using the printing plate, to print a halftone image on the printing paper.

In the plate-making apparatus, even in a case where the intervals in the width direction of adjacent light irradiation positions in the plurality of light irradiation positions on the printing plate are different from one another or the like, recording of an image is performed with use of halftone image data generated by comparing the original image 70 with the threshold matrix 81, to thereby suppress occurrence of graininess and the longitudinal streak extending in a direction corresponding to the scan direction in a printed image using the printing plate and further to improve the reproduction of thin lines, characters and the like in the printed image.

As discussed above, in various image recording apparatuses each of which has a head having a plurality of dot output elements for recording dots to a plurality of dot recording positions, respectively, arranged in a width direction perpendicular to a predetermined scan direction on an object to be printed or an object used in printing and a scanning mechanism for moving the plurality of dot recording positions on the object relatively to the object in the scan direction, the threshold matrix 81 generated in the above first and second preferred embodiments is compared with the original image 70 to generate halftone image data, and output control of the plurality of dot output elements is performed on the basis of the halftone image data, in parallel with relative movement of the plurality of dot recording positions on the object, to record a halftone image on the object. As a result, it is possible to suppress occurrence of graininess and the longitudinal streak extending in the scan direction in a printed image and further to improve the reproduction of thin lines, characters and the like in the printed image.

An element farthest from specified elements can be specified in various manners in Step S24 of FIG. 7. For example, there may be a case where a distance between each element in the target element group and its nearest specified element is obtained and an element where the distance is maximum is specified as an element which is farthest from specified elements.

In the printer, there may be a case where printing is performed by the head 21 which performs main scanning and sub scanning relatively to the printing paper 9. For example, in a printer where the width of arrangement of a plurality of outlets is narrower than that of a printed area on the printing paper 9 with respect to the width direction and a scanning mechanism for moving the head 21 relatively to the printing paper 9 in the scan direction and the width direction is provided, the head 21 moves in the scan direction (performs main scanning) while ejecting ink and moves in the width direction by a predetermined distance (performs sub scanning) after reaching an end portion of the printing paper 9, and then the head 21 moves in an opposite direction to the immediate main scanning in the scan direction while ejecting ink. As described above, the head 21 performs main scanning relatively to the printing paper 9 in the scan direction and intermittently performs sub scanning in the width direction every time when the main scanning is finished, to print an image on the whole printing paper 9 (in a so-called multi-path system).

In a printing operation in such a multi-path system, there may be a case where a plurality of dots which are (virtually) formed with one main scanning by each outlet and arranged in the scan direction in a line are treated as a dot group, and a technique for interpolating between adjacent dot groups in a plurality of dot groups arranged in the width direction in another main scanning of the head 21 (interlace in the sub scan direction) is used, or a technique for interpolating between adjacent dots in a plurality of dots which are formed with one main scanning by each outlet in another main scanning of the head 21 (interlace in the main scan direction) is used. However, in order to print an image on the printing paper 9 at higher speed, it is preferable the plurality of outlets included in each module of the head 21 are arranged so as to cover an entire printing area on the printing paper 9 with respect to the width direction and printing is completed by passing the printing paper 9 below the head 21 once (i.e., in one-path system).

Though, in the printer 1 of FIG. 1, the feeder 3 functions as a scanning mechanism for moving the ejection position on the printing paper 9 relatively to the printing paper 9 in the scan direction, a scanning mechanism for moving the head 21 in the scan direction perpendicular to the arrangement direction of the outlets may be provided.

In the above first and second preferred embodiments, the main body control part 4 functions as an image data generating apparatus for generating image data used in the printer 1, however, the function of the image data generating apparatus is not necessarily provided together with the main body 12 in the printer 1 as a unit. There may be a case where data of the final halftone image is generated in the image data generating apparatus which is provided independently of the main body 12 and the data of the final halftone image is inputted to a main body having the head 21 to print an image on the printing paper 9. The halftone image data may be used in the other applications such as displaying of an image on a display, as well as printing.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2007-137565 filed in the Japan Patent Office on May 24, 2007, the entire disclosure of which is incorporated herein by reference.

What is claimed is:

1. A threshold matrix generating method in a computer comprising a processor and a memory, for generating a threshold matrix which is compared with a grayscale original image in halftoning said original image, comprising the steps of:

a) assigning a plurality of stripe pattern areas, which are set in a matrix area in said memory and cross one another, to one of two element groups which correspond to two grayscale ranges and assigning remaining areas to the other of said two element groups, said matrix area being an area where a threshold matrix is generated in said memory, and a plurality of elements are arranged in a row direction and a column direction, said plurality of stripe pattern areas being tilted relatively to said row direction and said column direction, said two grayscale ranges being acquired by dividing a whole grayscale range;

b) specifying arbitrary one element in each element group to change said one element to a specified element and subsequently repeating a process of changing another element in said each element group to a specified element, said another element being farthest from specified elements in said each element group, on the premise of spatial repetition of said threshold matrix in halftoning of an original image, or repeating said process in accordance with a predetermined condition, to determine a turn-on order in which halftone dots are added to elements in said each element group in accordance with increase in gray level in a grayscale range corresponding to said each element group or a turn-off order in which halftone dots are removed from elements in said each element group in accordance with decrease in gray level in said grayscale range; and c) determining a threshold value of each element in said matrix area in accordance with a turn-on order(s) and/or a turn-off order(s) for said two element groups.

2. The threshold matrix generating method according to claim 1, wherein a threshold value representing absence of a dot is assigned to each of elements with larger numbers in said turn-on order or each of elements with smaller numbers in said turn-off order, in an element group corresponding to a grayscale range including a gray level at the end on a shadow side, in said step c).

3. The threshold matrix generating method according to claim 1, wherein said matrix area corresponds to one color component, and said steps a) to c) are performed in a matrix area of another color component which is different from said matrix area of said one color component, to generate a threshold matrix of said another color component which has a different size or a different pattern of element groups from said threshold matrix of said one color component.

4. The threshold matrix generating method according to claim 1, wherein resolutions in two directions which respectively correspond to said row direction and said column direction in said matrix area, are different from each other in an image recording apparatus for recording a halftone image, which is generated by halftoning said original image, on an object to be printed or an object used in printing, and a weighting coefficient for a distance in said row direction and a weighting coefficient for a distance in said column direction are different from each other in accordance with said resolutions in said two directions, when an element which is farthest from specified elements is specified in said step b).

5. The threshold matrix generating method according to claim 1, wherein a halftone image generated by halftoning said original image is recorded on an object to be printed by ejecting fine droplets of ink from a plurality of outlets arranged in a direction corresponding to said row direction in said matrix area, in an image recording apparatus for recording said halftone image on said object, and said predetermined condition in said step b) is that one of numbers 1 to $\alpha$ in said turn-on order is assigned to one element in each element column in said matrix area where said each element column are elements arranged in said column direction in said matrix area at each of positions in said row direction and the number of elements in said row direction in said matrix area is $\alpha$.

6. The threshold matrix generating method according to claim 1, wherein a plurality of dots having different sizes can be formed on an object to be printed or an object used in printing in an image recording apparatus for recording a halftone image, which is generated by halftoning said original image, on said object, and a threshold value of each element in said threshold matrix is a set of a plurality of sub-threshold values used for determination of a size of a dot.

7. An image data generating method of generating image data in a computer comprising a processor and a memory, comprising the steps of:

preparing a threshold matrix in a memory; and comparing a grayscale original image in said memory with said threshold matrix by an image data generator to generate halftone image data which represents said original image, wherein said threshold matrix is generated by executing steps including the steps of:

a) assigning a plurality of stripe pattern areas, which are set in a matrix area in said memory and cross one another, to one of two element groups which correspond to two grayscale ranges and assigning remaining areas to the other of said two element groups, said matrix area being an area where a threshold matrix is generated in said memory, and a plurality of elements are arranged in a row direction and a column direction, said plurality of stripe pattern areas being tilted relatively to said row direction and said column direction, said two grayscale ranges being acquired by dividing a whole grayscale range;

b) specifying arbitrary one element in each element group to change said one element to a specified element and subsequently repeating a process of changing another element in said each element group to a specified element, said another element being farthest from specified elements in said each element group, on the premise of spatial repetition of said threshold matrix in halftoning of an original image, or repeating said process in accordance with a predetermined condition, to determine a turn-on order in which halftone dots are added to elements in said each element group in accordance with increase in gray level in a grayscale range corresponding to said each element group or a turn-off order in which halftone dots are removed from elements in said each element group in accordance with decrease in gray level in said grayscale range; and c) determining a threshold value of each element in said matrix area in accordance with a turn-on order(s) and/or a turn-off order(s) for said two element groups.

8. An image data generating apparatus for generating image data, comprising:
    a memory for storing a threshold matrix; and
    an image data generator for comparing a grayscale original image with said threshold matrix to generate halftone image data which represents said original image, wherein
    said threshold matrix is generated by executing steps including the steps of:
    a) assigning a plurality of stripe pattern areas, which are set in a matrix area in said memory and cross one another, to one of two element groups which correspond to two grayscale ranges and assigning remaining areas to the other of said two element groups, said matrix area being an area in said memory where a threshold matrix is generated and a plurality of elements are arranged in a row direction and a column direction, said plurality of stripe pattern areas being tilted relatively to said row direction and said column direction, said two grayscale ranges being acquired by dividing a whole grayscale range;
    b) specifying arbitrary one element in each element group to change said one element to a specified element and subsequently repeating a process of changing another element in said each element group to a specified element, said another element being farthest from specified elements in said each element group, on the premise of spatial repetition of said threshold matrix in halftoning of an original image, or repeating said process in accordance with a predetermined condition, to determine a turn-on order in which halftone dots are added to elements in said each element group in accordance with increase in gray level in a grayscale range corresponding to said each element group or a turn-off order in which halftone dots are removed from elements in said each element group in accordance with decrease in gray level in said grayscale range; and
    c) determining a threshold value of each element in said matrix area in accordance with a turn-on order(s) and/or a turn-off order(s) for said two element groups.

9. The image data generating apparatus according to claim 8, wherein
    a threshold value representing absence of a dot is assigned to each of elements with larger numbers in said turn-on order or each of elements with smaller numbers in said turn-off order, in an element group corresponding to a grayscale range including a gray level at the end on a shadow side, in said step c).

10. The image data generating apparatus according to claim 8, wherein
    said matrix area corresponds to one color component, and
    said steps a) to c) are performed in a matrix area of another color component which is different from said matrix area of said one color component, to generate a threshold matrix of said another color component which has a different size or a different pattern of element groups from said threshold matrix of said one color component and store said threshold matrix of said another color component in said memory.

11. The image data generating apparatus according to claim 8, wherein
    resolutions in two directions which respectively correspond to said row direction and said column direction in said matrix area, are different from each other in an image recording apparatus for recording an image on an object to be printed or an object used in printing in accordance with said halftone image data, and
    a weighting coefficient for a distance in said row direction and a weighting coefficient for a distance in said column direction are different from each other in accordance with said resolutions in said two directions, when an element which is farthest from specified elements is specified in said step b).

12. The image data generating apparatus according to claim 8, wherein
    an image is recorded on an object to be printed by ejecting fine droplets of ink from a plurality of outlets arranged in a direction corresponding to said row direction in said matrix area, in an image recording apparatus for recording said image on said object in accordance with said halftone image data, and
    said predetermined condition in said step b) is that one of numbers 1 to $\alpha$ in said turn-on order is assigned to one element in each element column in said matrix area where said each element column are elements arranged in said column direction in said matrix area at each of positions in said row direction and the number of elements in said row direction in said matrix area is $\alpha$.

13. The image data generating apparatus according to claim 8, wherein
    a plurality of dots having different sizes can be formed on an object to be printed or an object used in printing in an image recording apparatus for recording an image on said object in accordance with said halftone image data, and
    a threshold value of each element in said threshold matrix is a set of a plurality of sub-threshold values used for determination of a size of a dot.

14. An image recording apparatus, comprising:
    a head having a plurality of dot output elements for recording dots to a plurality of dot recording positions, respectively, arranged in a width direction perpendicular to a predetermined scan direction on an object to be printed or an object used in printing;
    a scanning mechanism for moving said plurality of dot recording positions on said object relatively to said object in said scan direction;
    a memory for storing a threshold matrix;
    an image data generator for comparing a grayscale original image with said threshold matrix to generate halftone image data which represents said original image; and
    a control part for performing output control of said plurality of dot output elements on the basis of said halftone image data, in parallel with relative movement of said plurality of dot recording positions on said object, wherein
    said threshold matrix is generated by executing steps including the steps of:
    a) assigning a plurality of stripe pattern areas, which are set in a matrix area in said memory and cross one another, to one of two element groups which correspond to two grayscale ranges and assigning remaining areas to the other of said two element groups, said matrix area being an area in said memory where a threshold matrix is generated and a plurality of elements are arranged in a row direction and a column direction, said plurality of stripe pattern areas being tilted relatively to said row direction and said column direction, said two grayscale ranges being acquired by dividing a whole grayscale range;
    b) specifying arbitrary one element in each element group to change said one element to a specified element and subsequently repeating a process of changing another element in said each element group to a specified element, said another element being farthest from specified elements in said each element group, on the premise of spatial repetition of said threshold matrix in halftoning of an original image, or repeating said process in accordance with a predetermined condition, to determine a turn-on order in which halftone dots are added to elements in said each element group in accordance with increase in gray level in a grayscale range corresponding to said each element group or a turn-off order in which halftone dots are removed from elements in said each element group in accordance with decrease in gray level in said grayscale range; and c) determining a threshold value of each element in said matrix area in accordance with a turn-on order(s) and/or a turn-off order(s) for said two element groups.

15. The image recording apparatus according to claim 14, wherein
a threshold value representing absence of a dot is assigned to each of elements with larger numbers in said turn-on order or each of elements with smaller numbers in said turn-off order, in an element group corresponding to a grayscale range including a gray level at the end on a shadow side, in said step c).

16. The image recording apparatus according to claim 14, wherein
said matrix area corresponds to one color component, and
said steps a) to c) are performed in a matrix area of another color component which is different from said matrix area of said one color component, to generate a threshold matrix of said another color component which has a different size or a different pattern of element groups from said threshold matrix of said one color component and store said threshold matrix of said another color component in said memory.

17. The image recording apparatus according to claim 14, wherein
resolutions in two directions which respectively correspond to said row direction and said column direction in said matrix area, are different from each other, and
a weighting coefficient for a distance in said row direction and a weighting coefficient for a distance in said column direction are different from each other in accordance with said resolutions in said two directions, when an element which is farthest from specified elements is specified in said step b).

18. The image recording apparatus according to claim 14, wherein
said plurality of dot output elements are a plurality of outlets arranged in a direction corresponding to said row direction in said matrix area,
an image is recorded on an object to be printed by ejecting fine droplets of ink from said plurality of outlets, and
said predetermined condition in said step b) is that one of numbers 1 to α in said turn-on order is assigned to one element in each element column in said matrix area where said each element column are elements arranged in said column direction in said matrix area at each of positions in said row direction and the number of elements in said row direction in said matrix area is α.

19. The image recording apparatus according to claim 14, wherein
a plurality of dots having different sizes can be formed on an object to be printed or an object used in printing, and
a threshold value of each element in said threshold matrix is a set of a plurality of sub-threshold values used for determination of a size of a dot.

20. An electronic apparatus-readable recording medium which is non-transitory and in which data of a threshold matrix is recorded, said threshold matrix being compared with a grayscale original image in halftoning said original image, said data being generated by executing steps in a computer comprising a processor, including the steps of:

a) sequentially assigning a plurality of linear areas, which are arranged in an arrangement direction without spaces in a matrix area in said recording medium, to a plurality of element groups along said arrangement direction, said matrix area being an area in said recording medium where a threshold matrix is generated and a plurality of elements are arranged in a row direction and a column direction, each of said plurality of linear areas extending in a tilt direction tilted relatively to said row direction and said column direction, said arrangement direction being perpendicular to said tilt direction, said plurality of element groups corresponding to a plurality of grayscale ranges acquired by dividing a whole grayscale range;

b) specifying arbitrary one element in each element group to change said one element to a specified element and subsequently repeating a process of changing another element in said each element group to a specified element, said another element being farthest from specified elements in said each element group, on the premise of spatial repetition of said threshold matrix in halftoning of an original image, or repeating said process in accordance with a predetermined condition, to determine a turn-on order in which halftone dots are added to elements in said each element group in accordance with increase in gray level in a grayscale range corresponding to said each element group or a turn-off order in which halftone dots are removed from elements in said each element group in accordance with decrease in gray level in said grayscale range; and c) determining a threshold value of each element in said matrix area in accordance with a turn-on order(s) and/or a turn-off order(s) for said plurality of element groups.

* * * * *